(12) United States Patent
Mykland

(10) Patent No.: US 10,089,277 B2
(45) Date of Patent: Oct. 2, 2018

(54) CONFIGURABLE CIRCUIT ARRAY

(76) Inventor: Robert Keith Mykland, Capitola, CA (US)

( * ) Notice: Subject to any disclaimer, the term of this patent is extended or adjusted under 35 U.S.C. 154(b) by 1124 days.

(21) Appl. No.: 13/301,763

(22) Filed: Nov. 21, 2011

(65) Prior Publication Data

US 2012/0331244 A1    Dec. 27, 2012

Related U.S. Application Data

(60) Provisional application No. 61/500,619, filed on Jun. 24, 2011.

(51) Int. Cl.
*G06F 15/78* (2006.01)
(52) U.S. Cl.
CPC ................ *G06F 15/7867* (2013.01)
(58) Field of Classification Search
None
See application file for complete search history.

(56) References Cited

U.S. PATENT DOCUMENTS

| | | | |
|---|---|---|---|
| 5,317,743 A | 5/1994 | Imai et al. | |
| 5,465,373 A | 11/1995 | Kahle et al. | |
| 5,488,707 A | 1/1996 | Phillips et al. | |
| 5,822,591 A | 10/1998 | Hochmuth | |
| 5,950,009 A | 9/1999 | Bortnikov et al. | |
| 5,956,744 A * | 9/1999 | Robertson ............. | G06F 12/123 711/122 |
| 5,966,536 A | 10/1999 | Ravichandran | |
| 5,974,538 A | 10/1999 | Wilmot, II | |
| 6,438,737 B1 | 8/2002 | Morelli et al. | |
| 6,717,436 B2 | 4/2004 | Kress et al. | |
| 6,832,370 B1 | 12/2004 | Srinivasan et al. | |
| 6,868,017 B2 | 3/2005 | Ikeda | |
| 6,907,592 B1 | 6/2005 | Dante | |
| 6,988,183 B1 | 1/2006 | Wong | |
| 7,076,575 B2 | 7/2006 | Baitinger et al. | |

(Continued)

OTHER PUBLICATIONS

Finite state machine (FSM) from Hargrave's Communications Dictionary, Wiley Copyright © 2001 by the Institute of Electrical and Electronics Engineers, Inc.*

(Continued)

*Primary Examiner* — Jared Rutz
*Assistant Examiner* — Marwan Ayash

(57) ABSTRACT

A method and system are provided for configurable computation and data processing. A logical processor includes an array of logic elements. The processor may be a combinatorial circuit that can be applied to modify computational aspects of an array of reconfigurable circuits. A memory stores a plurality of instructions, each instruction including an instruction-fetch data portion and an output data transfer data portion. One or more memory controllers are coupled to the memory and receive instructions and/or output data from the memory. A back buffer is coupled with the memory controller and receives instructions from the memory controller. The back buffer sequentially asserts each received instruction upon one or more memory controllers. The memory controllers transfer data received from the memory to a target, such as an array of reconfigurable logic circuits that are optionally coupled to the memory, the back buffer, and one or more additional memory controllers.

9 Claims, 27 Drawing Sheets

(56) References Cited

U.S. PATENT DOCUMENTS

| | | |
|---|---|---|
| 7,155,602 B2 | 12/2006 | Poznanovic |
| 7,167,976 B2 | 1/2007 | Poznanovic |
| 7,171,659 B2 | 1/2007 | Becker et al. |
| 7,840,777 B2 | 11/2010 | Mykland |
| 7,840,950 B2 | 11/2010 | Mykland |
| 7,930,668 B1 | 4/2011 | Parsa |
| 8,078,849 B2 | 12/2011 | Libby et al. |
| 2003/0233595 A1 | 12/2003 | Charny et al. |
| 2004/0019765 A1 | 1/2004 | Klein, Jr. |
| 2004/0073899 A1 | 4/2004 | Luk et al. |
| 2004/0088685 A1 | 5/2004 | Poznanovic et al. |
| 2004/0107331 A1 | 6/2004 | Baxter |
| 2005/0044195 A1 | 2/2005 | Westfall |
| 2006/0004997 A1* | 1/2006 | Mykland ................ 712/244 |
| 2006/0031600 A1* | 2/2006 | Ellis et al. ................ 710/22 |
| 2006/0242385 A1 | 10/2006 | Murakami et al. |
| 2006/0248317 A1 | 11/2006 | Vorbach et al. |
| 2007/0198971 A1 | 8/2007 | Dasu et al. |
| 2008/0005498 A1 | 1/2008 | Morena et al. |
| 2008/0189703 A1 | 8/2008 | Im et al. |
| 2009/0119490 A1 | 5/2009 | Oh et al. |
| 2009/0119654 A1 | 5/2009 | Kawahito et al. |
| 2009/0240928 A1 | 9/2009 | Fischer et al. |
| 2009/0241083 A1 | 9/2009 | Olgiati et al. |
| 2010/0185839 A1 | 7/2010 | Oh et al. |
| 2011/0113411 A1 | 5/2011 | Yonezu |
| 2012/0096444 A1 | 4/2012 | Wright et al. |
| 2012/0331450 A1 | 12/2012 | Mykland |

OTHER PUBLICATIONS

U.S. Appl. No. 13/301,763, filed Nov. 2011, Mykland, R.K.

* cited by examiner

FIG. 19 SIZE COUNTER CIRCUIT 607

FIG. 20 MEMORY ADDRESS CIRCUIT 616

FIG. 23

State machine ROM contents

Inputs

| | | | | | | | |
|---|---|---|---|---|---|---|---|
| Bit 0: Not initialized | 0 | 1 | 1 | 1 | 1 | 0 | 1 | 1 |
| Bit 1: Down counter zero | 0 | 0 | 0 | 1 | 0 | 0 | 1 | 1 |
| Bit 2: Transfer/fetch | 0 | 0 | 1 | 0 | 1 | 1 | 1 | 1 |

Outputs

| | | | | | | | |
|---|---|---|---|---|---|---|---|
| Bit 0: BB Assert (high) | 0 | 0 | 0 | 0 | 0 | 0 | 0 | 0 |
| Bit 1: Size Load (fall) | 1 | 0 | 1 | 0 | 0 | 1 | 1 | 1 |
| Bit 2: Size Dec. (rise) | 1 | 1 | 1 | 1 | 1 | 0 | 1 | 1 |
| Bit 3: BB Write (low) | 1 | 1 | 1 | 0 | 0 | 1 | 0 | 1 |
| Bit 5: Target Load (fall) | 0 | 0 | 0 | 1 | 0 | 0 | 1 | 1 |
| Bit 6: Target Assert (low) | 0 | 0 | 0 | 0 | 0 | 0 | 1 | 1 |
| Bit 7: Target Inc. (rise) | 0 | 0 | 0 | 0 | 1 | 0 | 1 | 1 |
| Bit 8: Memory Load (fall) | 1 | 1 | 1 | 1 | 1 | 1 | 1 | 1 |
| Bit 9: Memory Assert (low) | 1 | 1 | 1 | 1 | 1 | 1 | 1 | 1 |
| Bit 10: Memory Inc. (rise) | 1 | 1 | 1 | 1 | 1 | 1 | 1 | 1 |
| Bit 11: Transfer Fetch (high) | 0 | 0 | 1 | 1 | 0 | 0 | 0 | 0 |

CONFIGURABLE CIRCUIT ARRAY

CO-PENDING PROVISIONAL PATENT APPLICATION

This Nonprovisional patent application is a Continuation-in-Part application to Provisional Patent Application Ser. No. 61/500,619, filed on Jun. 24, 2011 by inventor Robert Mykland. Provisional Patent Application Ser. No. 61/500,619 is hereby incorporated by reference in its entirety and for all purposes, to include claiming benefit of the priority date of filing of Nonprovisional Patent Application Ser. No. 61/500,619.

FIELD OF THE INVENTION

The present invention relates to information technology. More particularly, the present invention relates to methods of and systems for data processing and general purpose computing.

BACKGROUND OF THE INVENTION

The prior art offer several attempts to maximize the efficiency of logic circuitry for a particular purpose while enabling robust, full purpose general computing by means of a same data processing or computational engine. These prior art efforts include method and systems (a.) based on the Von Neumann architecture; (b.) that apply field programmable gate array devices and/or programmable logic devices; (c.) that include application-specific integrated circuit devices; (d.) based on Side-by-Side processing; (e.) that apply Very Long Instruction Word concepts; and/or (f.) that instantiate Cell Processor.

With all of these efforts in improved data processing and accelerated computational processing, most conventional electronic logic processors still include a dedicated arithmetic logic unit (hereinafter, "ALU") that is tasked with computation. The ALU may be fed by a register file; that is, the computations that are performed in the ALU are computations performed on data that is stored in this register file. Information or words of data travel from the register file into the ALU and then the results travel from the ALU back into the register file.

The prior art teaches that the data stored in the memory may be moved, read from and acted upon by the ALU and then stored away is a sequence of operating codes (hereinafter, "op-codes"). Each individual op-code is formed by a unique set of instructions which in combination direct the processor to perform a small incremental operation, i.e., the size of one computation, such as one add or one multiply, or one load from a location in memory into a register in the register file.

Similarly, words in memory, e.g., stored in an external memory or cache, in prior art structures generally go from memory into the register file, and then from the register file back into memory. Early on in the computer era, memory could be directly connected to ALU, but such connectivity is substantially impractical in most modern architectures, and the prior art teaches away from reducing mediation of interactivity between a memory and (a.) a data processing array; and/or (b.) or a computational engine of a computer.

Yet significant processing delays are introduced in forcing heterogeneous circuit elements of a data processing system, to include general-purpose computers, to transfer instructions through circuitous steps in the process of organizing resources to apply configuration and operating data in order to create a desired output.

Certain prior art processors include a register called a program counter that may contain the address of a next instruction to be executed by the processor. Prior art branch operations, to include fetch and many control functions, are often executed in the prior art by modifying this program counter register to sequentially point to differing and appropriate addresses within a system memory and/or addresses of other memory accessible to the processor where executable instructions are stored.

In one example, prior art op-code based processors typically perform only a small amount of computational work per instruction, wherein the prior art processor might, for example, first require receiving and executing many instructions before the processor might be enabled to calculate or determine where to next branch to within a software-directed process. In novel distinction, in a computational or data processing system operating in accordance with certain optional aspects of the method of the present invention, an instruction may be provided that enables a processor to execute or instantiate the equivalent of dozens or hundreds of prior art instructions. Another optional aspect of invented method optionally includes providing the instruction to the processor having a portion of the currently executable instruction that specifically determines how a succeeding executable instruction may be read, acquired, received, and/or generated for use by the processor.

The execution of pluralities or multiplicities of prior art instructions by a prior art processor require the commitment of multiplicities of system clock cycles to perform certain required operational activities and thus fail to optimally employ the data processing and computational potential of processor operations. There is therefore a long-felt need to provide superior methods and systems that more efficiently and flexibly execute computational and data processing tasks.

SUMMARY AND OBJECTS OF INVENTION

It is an object of the present invention to provide a system and method for computational processing.

It is another optional object of the method of the present invention to provide a system and method for wherein one or more instructions provided to a processor that each individually enable a computer and/or a data processing system to perform or execute the equivalent of dozens or hundreds of certain prior art instructions.

It is another object optional object of the method of the present invention to provide a system and method wherein an instruction is provided to a data processing circuit wherein the provided instruction includes direction to a computational system or data processing system on where and how to locate, read, acquire and/or generate a succeeding instruction.

Towards these objects and other objects that will be made obvious in light of this disclosure, a first version of the method of the present invention provides a computer system that is configurable for computational processing. A first preferred embodiment of the method of the present invention (hereinafter, "first version") provides a logical processor that includes an array of computational elements termed "logic elements." The first version does not require that circuits of the array, and connectivity within this array, be clocked or synchronized. The processor of the first version, and/or a logical array of the first version, may be a combinatorial circuit that can be reconfigured externally to modify the computational aspects of the array. While the array of the first version may be optimized for digital signal processing applications, it is understood that other alternate preferred embodiments of the present invention are not limited, nor optimally suited for the area of digital signal processing.

Certain alternate preferred embodiments of the method of the present invention include a memory storing a plurality of instructions, each instruction including a fetch configuration data portion and a transfer configuration data portion; one or more memory controllers coupled to the memory, and wherein each memory controller is adapted to receive instructions and output data from the memory; and a back buffer coupled with the memory controller and adapted to receive instructions from the memory controller and sequentially assert each received instruction upon the memory controller. The memory controller transfers output data received from the memory to a receiving circuit, device or address in accordance with the transfer configuration data portion of the most recently asserted instruction; and accesses a next instruction from the memory in accordance with the fetch configuration data portion of the most recently asserted instruction.

In certain still alternate preferred embodiments of the method of the present invention, some or all of an array of reconfigurable logic circuits are communicatively or bi-directionally communicatively coupled to the memory, the back buffer, and one or more memory controllers.

Additionally or alternately, the invented processor may include a reprogrammable logic unit as disclosed in U.S. Pat. No. 7,840,777 issued on Nov. 23, 2011 to inventor Robert Mykland and titled "Method and apparatus for directing a computational array to execute a plurality of successive computational array instructions at runtime".

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 7,840,777 (inventor: Mykland; issued on Nov. 23, 2010) titled "Method and apparatus for directing a computational array to execute a plurality of successive computational array instructions at runtime"; U.S. Pat. No. 6,438,737 (inventors: Morelli, et al.; issued on Aug. 20, 2002) titled "Reconfigurable logic for a computer"; U.S. Pat. No. 7,171,659 (inventors: Becker, et al.; issued on Jan. 30, 2007) titled "System and method for configurable software provisioning"; U.S. Pat. No. 7,167,976 (inventor: Poznanovic, D.; issued on Jan. 23, 2007) titled "Interface for integrating reconfigurable processors into a general purpose computing system"; U.S. Pat. No. 7,155,602 (inventor: Poznanovic, D.; issued on Dec. 26, 2006) titled "Interface for integrating reconfigurable processors into a general purpose computing system"; U.S. Pat. No. 7,076,575 (inventor: Baitinger, et al.; issued on Jul. 11, 2006) titled "Method and system for efficient access to remote I/O functions in embedded control environments"; U.S. Pat. No. 6,868,017 (inventor: Ikeda, K.; issued on Mar. 15, 2005) titled "Integrated circuit device"; and U.S. Pat. No. 6,717,436 (inventors: Kress, et al.; issued on Apr. 6, 2004) titled "Reconfigurable gate array".

Such incorporations further include US Patent Appn. Publication Ser. No. 20060004997 (inventor: Mykland, Robert; published on Jan. 5, 2006) titled "Method and apparatus for computing"; US Patent Appn. Publication Ser. No. 20040068329 (inventor: Mykland, Robert; published on Apr. 8, 2004) titled "Method and apparatus for general purpose computing"; US Patent Appn. Publication Ser. No. 20040019765 (inventor: Klein, Robert C. JR.; published on Jan. 29, 2004) titled "Pipelined reconfigurable dynamic instruction set processor"; and US Patent Appn. Publication Ser. No. 20040107331 (inventor: Baxter, Michael A.; published on Jun. 3, 2004) titled "Meta-address architecture for parallel, dynamically reconfigurable computing".

In addition, each and all publications, patents, and patent applications mentioned in this specification are herein incorporated by reference to the same extent in their entirety and for all purposes as if each individual publication, patent, or patent application was specifically and individually indicated to be incorporated by reference. The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of the invention, may be better understood with reference to the accompanying specification and drawings depicting the preferred embodiment, in which:

FIG. 23 is a representation of some of the data contents of the state machine read-only memory of FIG. 18;

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
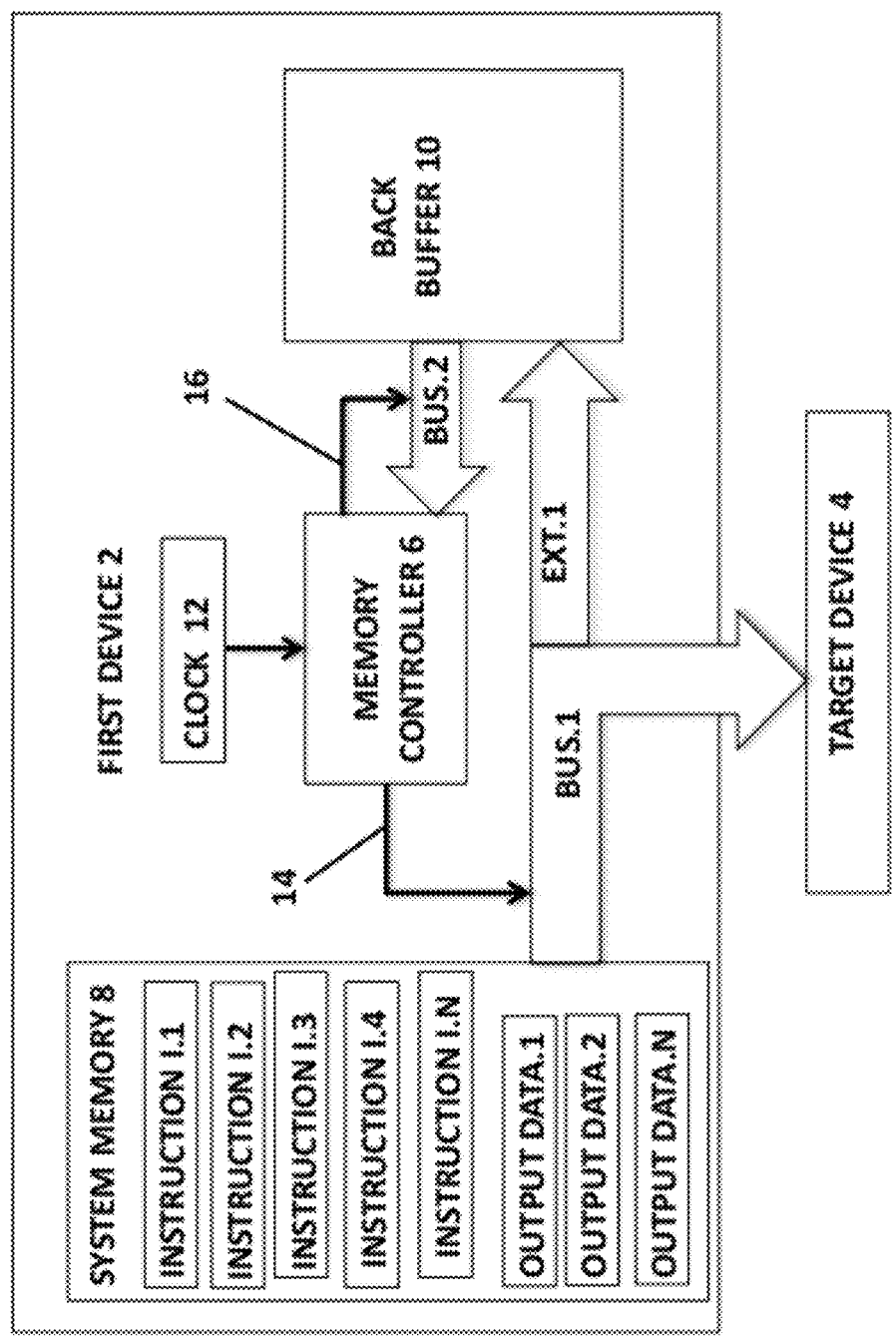
FIG. 1 is a functional block diagram of a first invented device having a memory controller, a system memory and a back buffer, wherein the first invented device that is communicatively coupled with a target circuit.

Referring now generally to the Figures and particularly to FIG. 1, FIG. 1 is a functional block diagram of a first invented device 2 (hereinafter, "first device" 2) that is communicatively coupled with a target circuit 4 (hereinafter, "target device" 4) whereby source output data DATA.1-DATA.N is transferred by a memory controller 6 of the first device 2 and to the target device 4 in accordance with one or more instructions I.1-I.N. The invented device 2 may comprise a semiconductor die and/or be or be comprised within a packaged electronic integrated circuit device in certain alternate preferred embodiments of the invented device 2. The target device 4 may comprise a semiconductor die and/or be or comprised within a packaged electronic integrated circuit device in certain alternate preferred embodiments of the method of the present invention.

The first device 2 includes a memory controller 6, a system memory 8, a back buffer 10, a clock 12, a first plurality of control lines 14, a second plurality of control lines 16, a first communications bus BUS.1 and a second communications bus BUS.2. The memory controller 6 is a configurable logic circuit that is adapted to (a.) direct data flow through the first communications bus BUS.1 by means of the first plurality of control lines 14; and (b.) direct data flow through the second communications bus BUS.2 by means of the second plurality of control lines 16.

The first bus BUS.1 comprises a first extension communications bus EXT.1 that supports transfer of instructions I.1-I.N to the back buffer 10. The memory controller 6 directs the first communications bus BUS.1 (hereinafter, "first bus" BUS.1) by means of the first plurality of control lines 14 to (a.) write instructions I.1-I.N from the system memory 8 and to the back buffer 10; and (b.) write output data DATA.1-DATA.N from the system memory 8 to and to the target device 4. The memory controller 6 directs the second communications bus BUS.2 (hereinafter, "second bus" BUS.2) by means of the second plurality of control lines 16, and directs the second bus BUS.1 to assert instructions I.1-I.N from the back buffer 10 and onto the memory controller 6 itself. The direction of the transfer of output data DATA.1-DATA.N by the memory controller 6 is performed by the memory controller in accordance with one or more instruction I.1-I.N originally stored in the system memory 8 and sequentially asserted by the back buffer 10 onto the memory controller 6. In addition, an assertion of one instruction I.1-I.N by the back buffer 10 onto the memory controller 6 causes the memory controller 6 to transfer the succeeding instruction I.1-I.N from the system memory 8 to the back buffer 10. For example, the assertion of the first instruction I.1 by the back buffer 10 onto the memory controller 6, causes the memory controller to both (a.) direct the first bus to write at least one output data DATA.1-DATA.N from the system memory 8 to the target device 4; and (b.) write the second instruction I.2 from the system memory 8 and into the back buffer 10. The second instruction I.2 is then asserted by the back buffer 10 onto the memory controller 6 and a third instruction I.3 is read into the back buffer 8; whereupon the third instruction is next asserted by the back buffer 10 onto the memory controller 6.

The clock 12 is coupled to the memory controller 6 and is applied to synchronize the operations of the memory controller 6, the system memory 8 and the back buffer 10 as required by certain alternate and/or optional aspects of the method of the present invention. The clock 12 may alternatively be comprised in whole or in part within an element or circuit of the first device 2, such as the memory controller 6.

Figure 2:
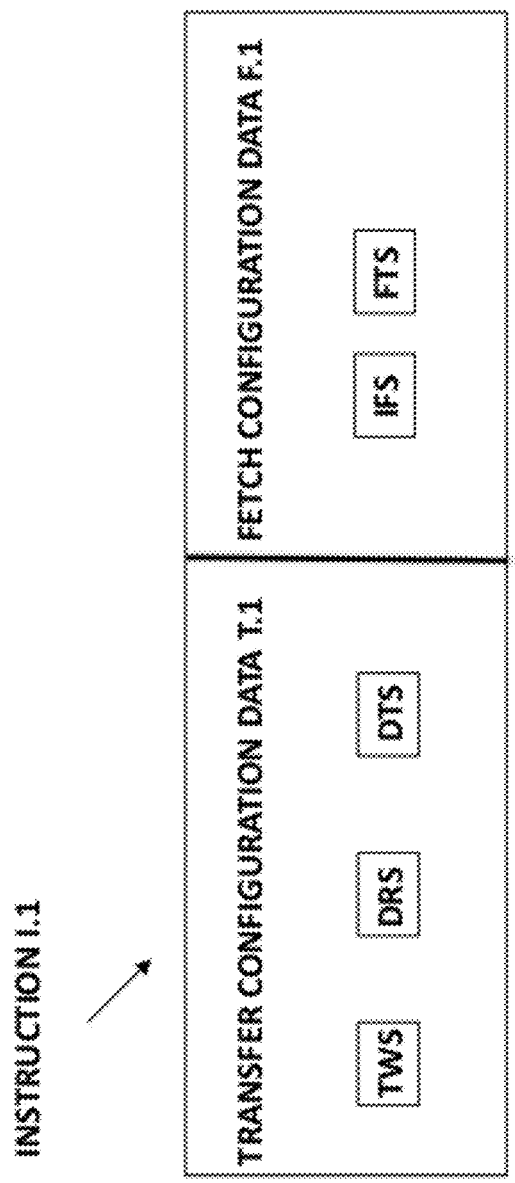
FIG. 2 is a diagram of an exemplary first instruction of the first invented device (or, "first device") of FIG. 1.

Referring now generally to the Figures and particularly to FIG. 2, FIG. 2 is a diagram of an exemplary first instruction I.1 that is formatted and populated with data in accordance with a first aspect of the method of the present invention. It is understood that additional instructions I.2-I.N may contain some or all of the aspects of the exemplary first instruction I.1 as disclosed herein.

The transfer configuration data portion T.1 of the first instruction is asserted by the back buffer 10 upon the memory controller 6 to configure the memory controller 6 to read data DATA.1-DATA.N from the system memory 8 and transfer the data to the target device 4.

The fetch configuration data portion F.1 of the first instruction is asserted by the back buffer 10 upon the memory controller 6 to configure the memory controller 6 to (a.) fetch a next instruction I.2-I.N, for example a second instruction I.2, from the system memory 8; and (b.) transfer the second instruction I.2 to the back buffer 10. The second instruction I.2 is then asserted upon the system memory 8 to configure the memory controller 6 to both (a.) fetch a succeeding instruction I.3-I.N from the system memory 8; and/or (b.) transfer data DATA.1-DATA.N from the system memory 8 to the target device 4.

Each instruction I.1-I.N may include a fetch configuration data portion F.1 that comprises (a.) an instruction fetch read start address value IFS of a following instruction I.1-I.N to be fetched and loaded into the back buffer 10; and/or (b.) an optional fetch transfer size value FTS of the following instruction I.1-I.N. It is understood that in certain versions of the method of the present invention, one or more instructions I.1-I.N do not include a fetch transfer size value FTS at least in cases where the instructions I.1-I.N are consistently of a fixed memory size and the transfer value size FTS may thereby be pre-established in the memory controller 6.

A transfer and execution cycle of the exemplary first instruction I.1 includes the following states (1.) storage in the system memory 8; (2.) transfer from the system memory 8 to the back buffer 10 via the first bus BUS.1; (3.) assertion by the back buffer 10 upon the memory controller 6 via the second bus BUS.2; and (4.) execution by the memory controller 6

The exemplary transfer configuration data portion T.1 of the first instruction I.1 directs the system memory on both (1.) where in the system memory 8 to read an output data DATA.1-DATA.N; and (2.) how and where to write output data DATA.1-DATA.N specified in the first instruction I.1 into the target device 4.

Each instruction I.1-I.N may include a transfer configuration data portion T.1 that comprises (a.) a target address write start address value TWS; (b.) a system memory output data read start address value DRS of an instant output data DATA.1-DATA.N; and (c.) a transfer size value DTS of the output data DATA.1-DATA.N indicated by the associated output data read start address value DRS.

The exemplary fetch configuration data portion F.1 of the first instruction I.1 (or any instruction I.2-I.N comprising the exemplary comprising fetch configuration data portion F.1) directs the system memory on where in the system memory 8 the memory controller shall read the second instruction I.2. When the exemplary fetch configuration data portion F.1 is executed by the memory controller 6, the second instruction I.2 is transferred from the system memory 8 to the back buffer 10 as per the second and third states of the instruction transfer and execution cycle discussed in the preceding paragraph. The second instruction I.2 is then asserted by the back buffer 10 upon the memory controller 6 by the back buffer 10 in a succeeding fourth state of the second instruction I.2.

At least certain instances of the output data DATA.1-DATA.N of the first device 2 preferably exhibits a data transfer cycle that passes through the following states: (1.) storage in the system memory 8; (2.) selection by the memory controller 6 as directed by an instruction I.1-I.N and in the execution of a fetch configuration data portion F.1 of at least one instruction I.1-I.N; (3.) transfer via the first bus BUS.1 from the system memory 8 onto first bus BUS.1; and (4.) transfer from the first bus BUS.1 and to the target device 4.

It is understood that FIG. 1 displays the first instruction I.1 as an example of a the layout and structure of each remaining instruction I.2-I.N, and further that each and every instruction I.2-I.N may have a unique and different fetch configuration data portion F.1 and/or unique and different transfer configuration data portion T.1.

Figure 3:
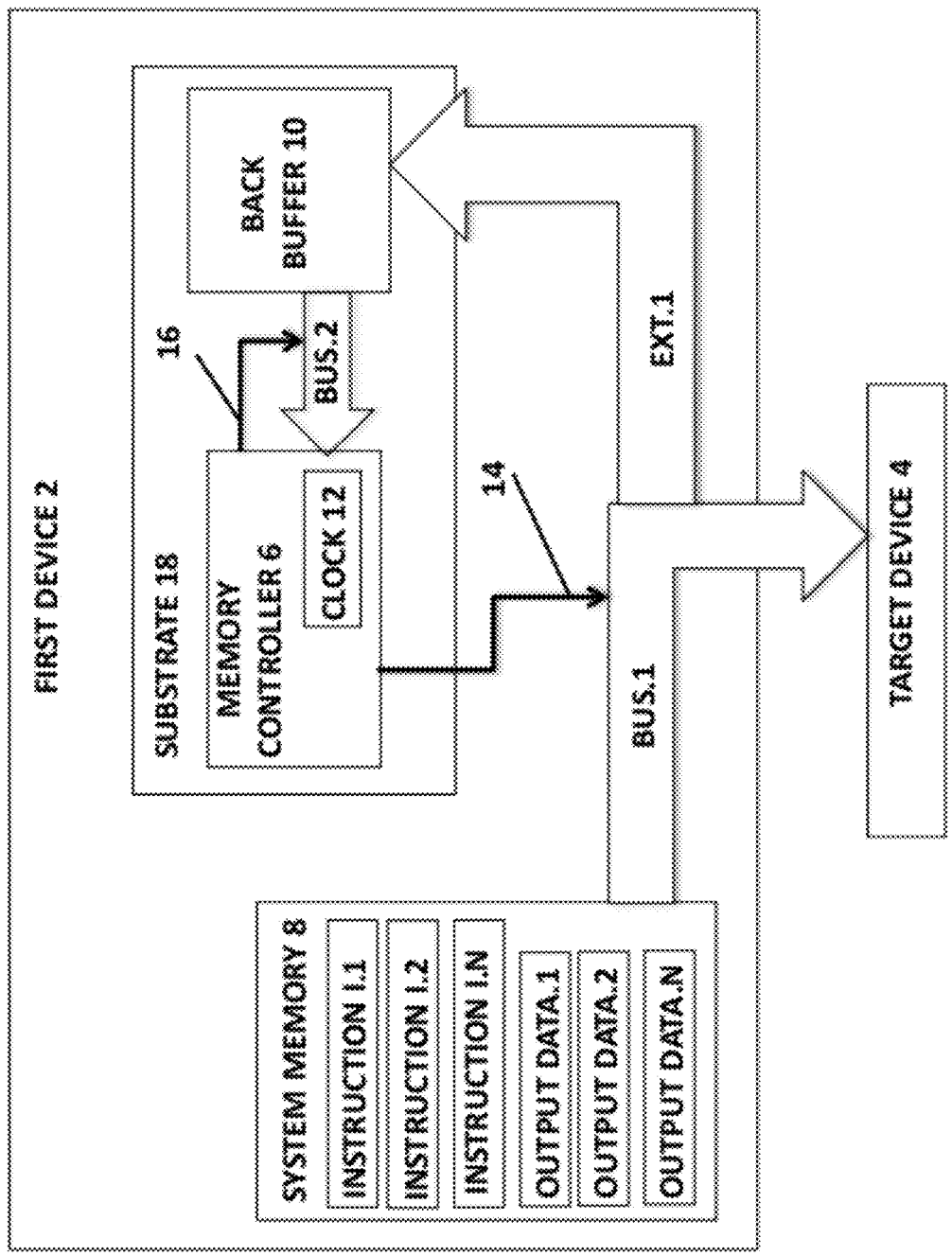
FIG. 3 is a functional block diagram of a first alternate version of the first device of FIG. 1, wherein the memory controller and the back buffer are integrated circuits formed on a same substrate

Referring now generally to the Figures and particularly to FIG. 3, FIG. 3 is a functional block diagram of a first alternate version of the first device 2, wherein the memory controller 6 and the back buffer 10 are integrated circuits formed on a same substrate 18, whereby the speed of communications between the memory controller 6 and the back buffer 10 may be increased.

Figure 4:
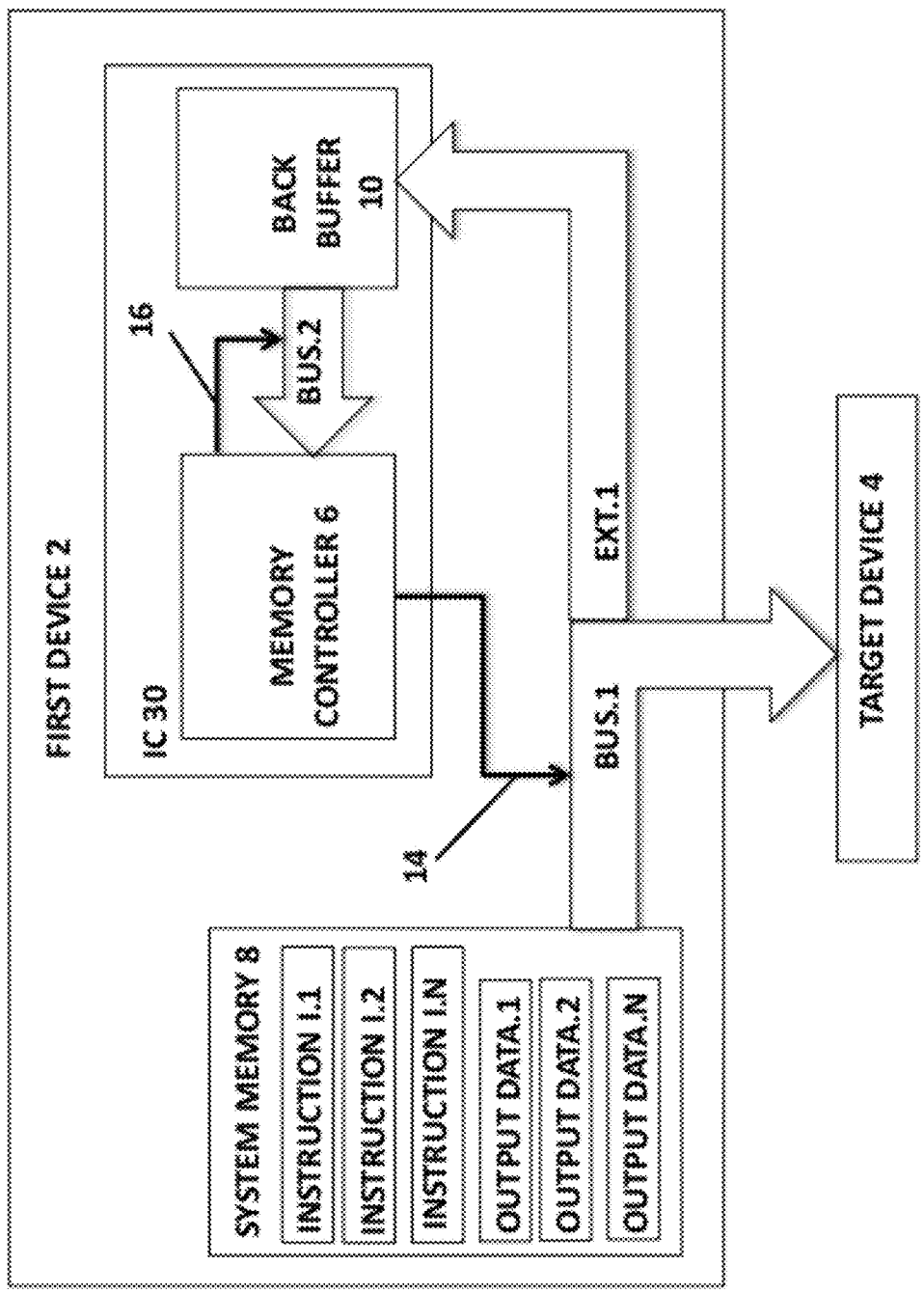
FIG. 4 is a functional block diagram of a second alternate version of the first device of FIG. 1, wherein the memory controller 6 and the back buffer 10 are formed within a same integrated circuit.

Referring now generally to the Figures and particularly to FIG. 4, FIG. 4 is a functional block diagram of a second alternate version of the first device 2, wherein the memory controller 6 and the back buffer 10 are formed within a same integrated circuit IC 20, wherein the speed of communication between the memory controller 6 and back buffer 10 is improved.

Figure 5:
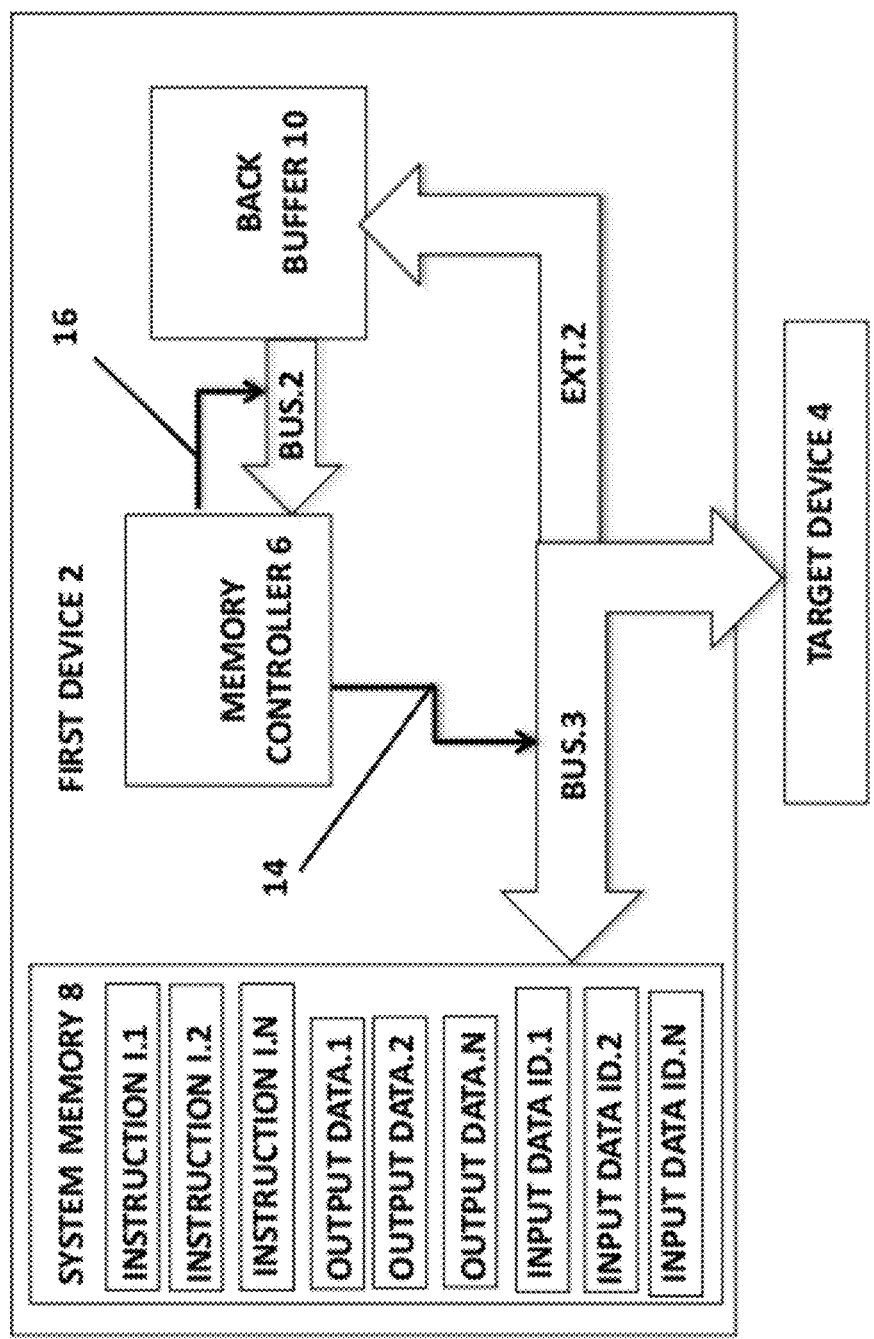
FIG. 5 is a functional block diagram of a third alternate version of the first device of FIG. 1, wherein the system memory is bi-directionally coupled with the target device.

Referring now generally to the Figures and particularly to FIG. 5, FIG. 5 is a functional block diagram of a third alternate version of the first device 2, wherein the system memory 8 is bi-directionally coupled with the target device 4. The memory controller 6 is adapted or configured to direct the third bus BUS.3 to accept input target data ID.1-ID.N from the target device 4 and to write the input target data ID.1-ID.N to the system memory 8. It is understood that the input data ID.10ID.N may comprise one or more instructions I.1-I.N and/or information to be included in one or more instructions I.1-I.N A bi-directional third communications bus BUS.3 comprises the first extension communications bus EXT.1 that supports transfer of instructions I.1-I.N to the back buffer 10. The third bus bus.3 bi-directionally communicatively couples the system memory 8 and the memory controller 6, whereby the memory controller may direct the third communications bus BUS.3 to (a.) sequentially write instructions I.1-I.N from the system memory 8 to the back buffer 10; (b.) write output data DATA.1-DATA.N from the system memory 8 to the target device 4; and (c.) write input data ID.1-ID.N into the system memory 8 from the target device 4.

Figure 6:
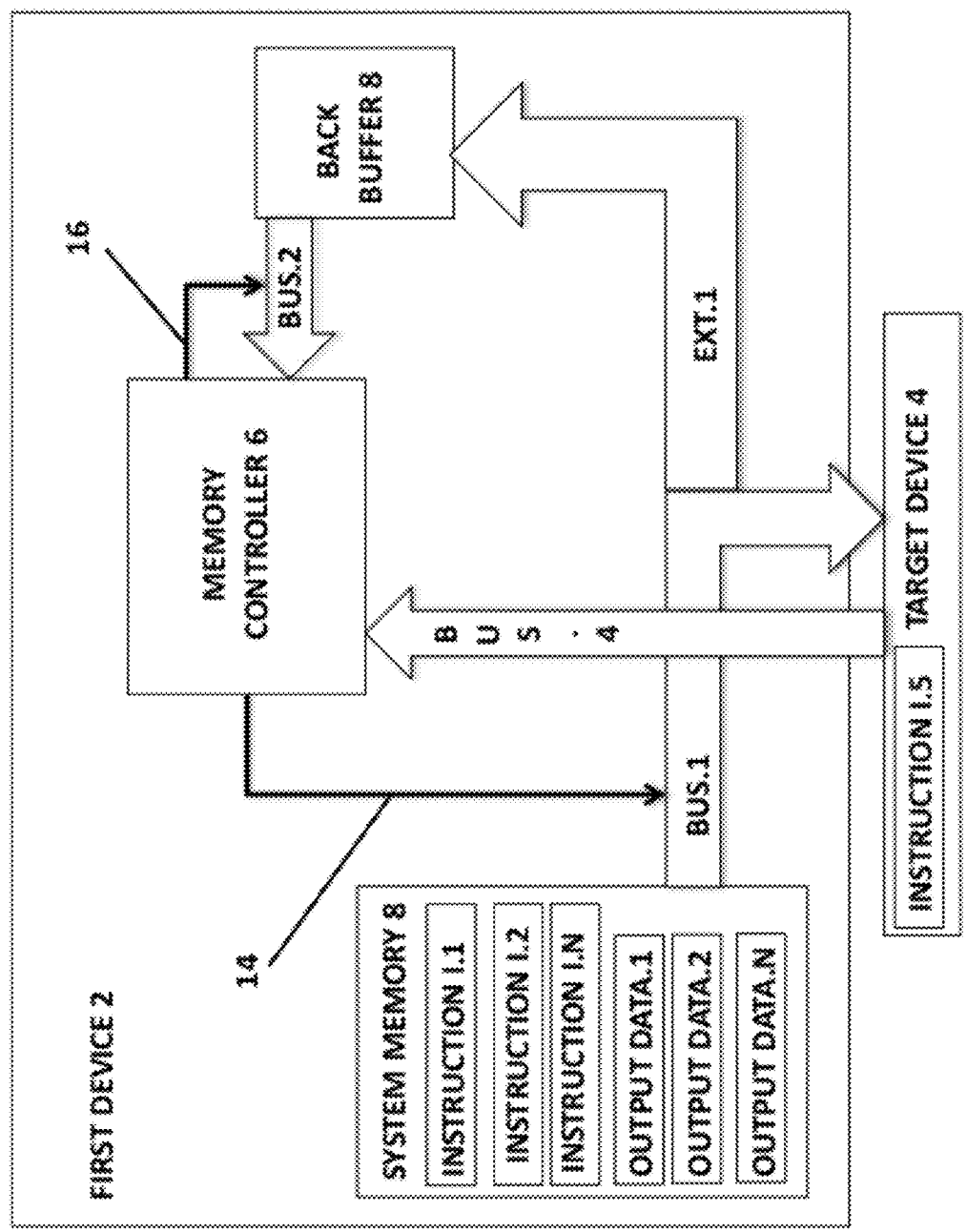
FIG. 6 is a functional block diagram of a fifth alternate version of the first device of FIG. 1, wherein the memory controller is communicatively coupled with the target device by a fourth communications bus.

Referring now generally to the Figures and particularly to FIG. 6, FIG. 6 is a functional block diagram of a fifth alternate version of the first device 2, wherein the memory controller 6 is communicatively coupled with the target device 4 by a fourth communications bus BUS.4. In the fifth alternate version of the first device 2, the memory controller 6 is adapted or configured to receive configuration data of one or more instructions, e.g., transfer configuration data portions T.1 and/or elements of one or more fetch configuration data portions F.1, from the target device 4. In other words, the fourth communications bus BUS.4 enables the target device 4 to assert upon the memory controller 6 some or all of one or more (a.) elements of memory controller configuration instructions; (b.) fetch configuration data portion F.1; and/or (c.) transfer configuration portions T.1.

Figure 7:
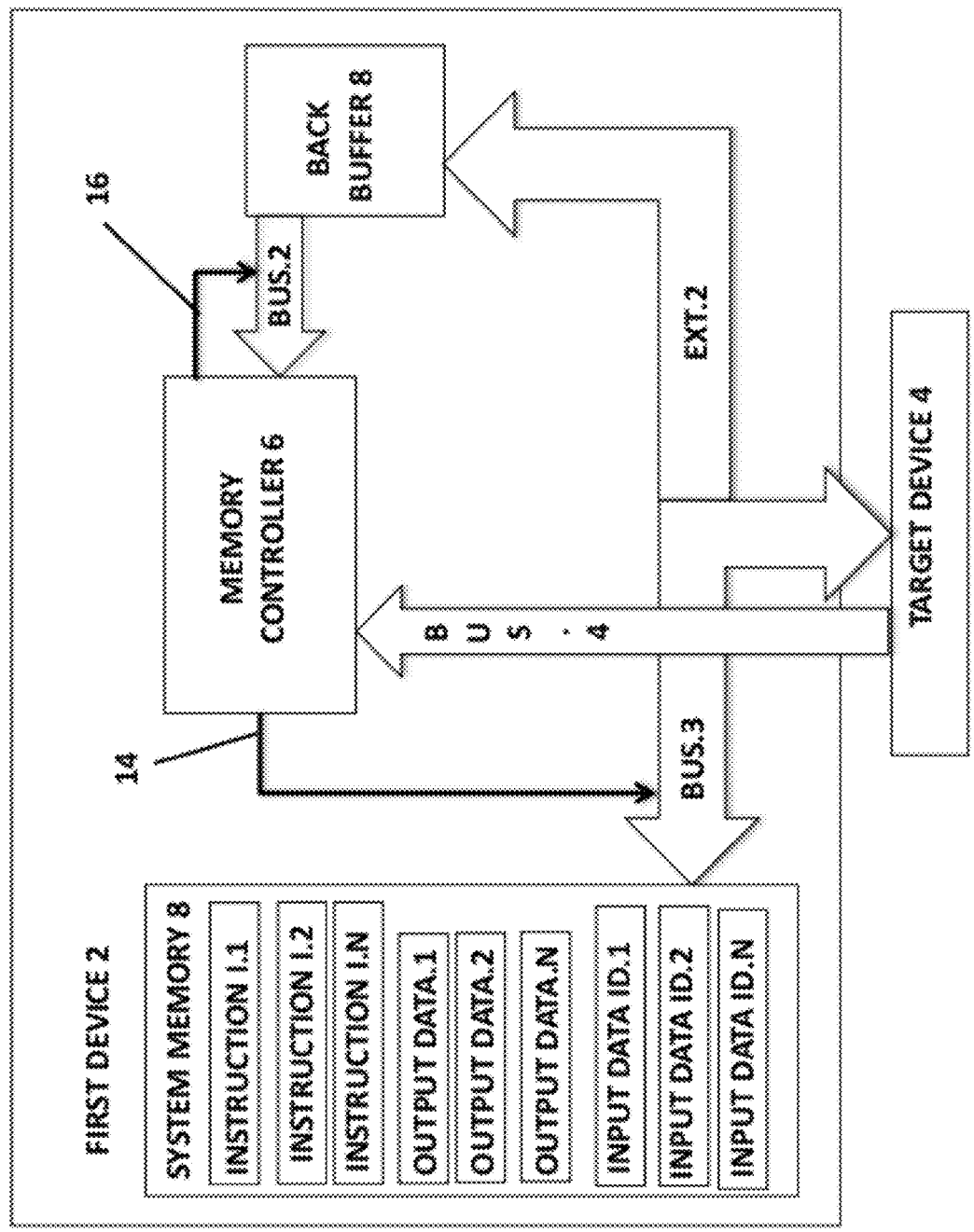
FIG. 7 is a functional block diagram of a sixth alternate version of the first device of FIG. 1, wherein the system memory is bi-directionally coupled with the target device by a third bus.

Referring now generally to the Figures and particularly to FIG. 7, FIG. 7 is a functional block diagram of a sixth alternate version of the first device 2, wherein the system memory 8 is bi-directionally coupled with the target device 4 by the third bus BUS.3. The memory controller 6 is adapted and/or configured to direct the third bus BUS.3 receive input data ID.1-ID.N from the target device 4 and to write the input data ID.1-ID.N to the system memory 8. It is understood that the input data ID.10ID.N may comprise one or more instructions I.1-I.N, one or more memory controller configurations instructions and/or information to be included in one or more memory controller configuration instructions.

The memory controller 6 is further adapted and/or configured to receive configuration data of one or more instructions I.1-I.N, e.g., transfer configuration data portions T.1 and/or elements of one or more fetch configuration data portions F.1, from the target device 4 via the fourth bus BUS.4.

Figure 8:
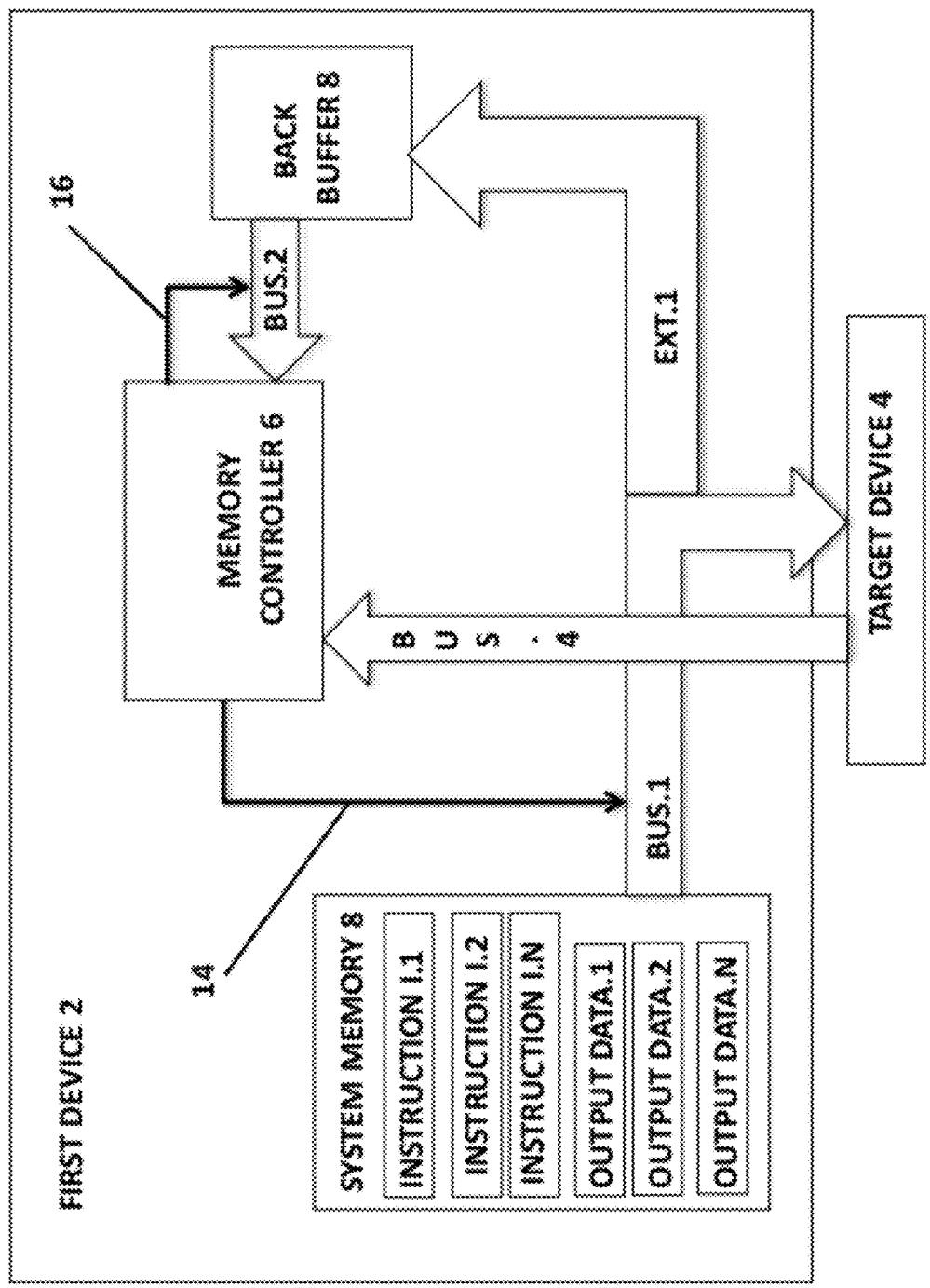
FIG. 8 is a functional block diagram of a seventh alternate version of the first device of FIG. 1, wherein the memory controller is adapted and/or configured to send elements of one or more instructions of FIG. 1 via the fourth bus of FIG. 6.

Referring now generally to the Figures and particularly to FIG. 8, FIG. 8 is a functional block diagram of a seventh alternate version of the first device 2, wherein the memory controller 6 is adapted and/or configured to send elements of one or more instructions I.1-I.N, i.e., elements of one of one or more transfer configuration data portions T.1 and/or elements of one or more fetch configuration data portions F.1 via the fourth bus BUS.4. The memory controller 6 is further adapted and/or configured to receive assertions of configuration data, e.g., transfer configuration data portions T.1 and/or elements of one or more fetch configuration data portions F.1, from the target device 4 via the fourth bus BUS.4.

Figure 9:
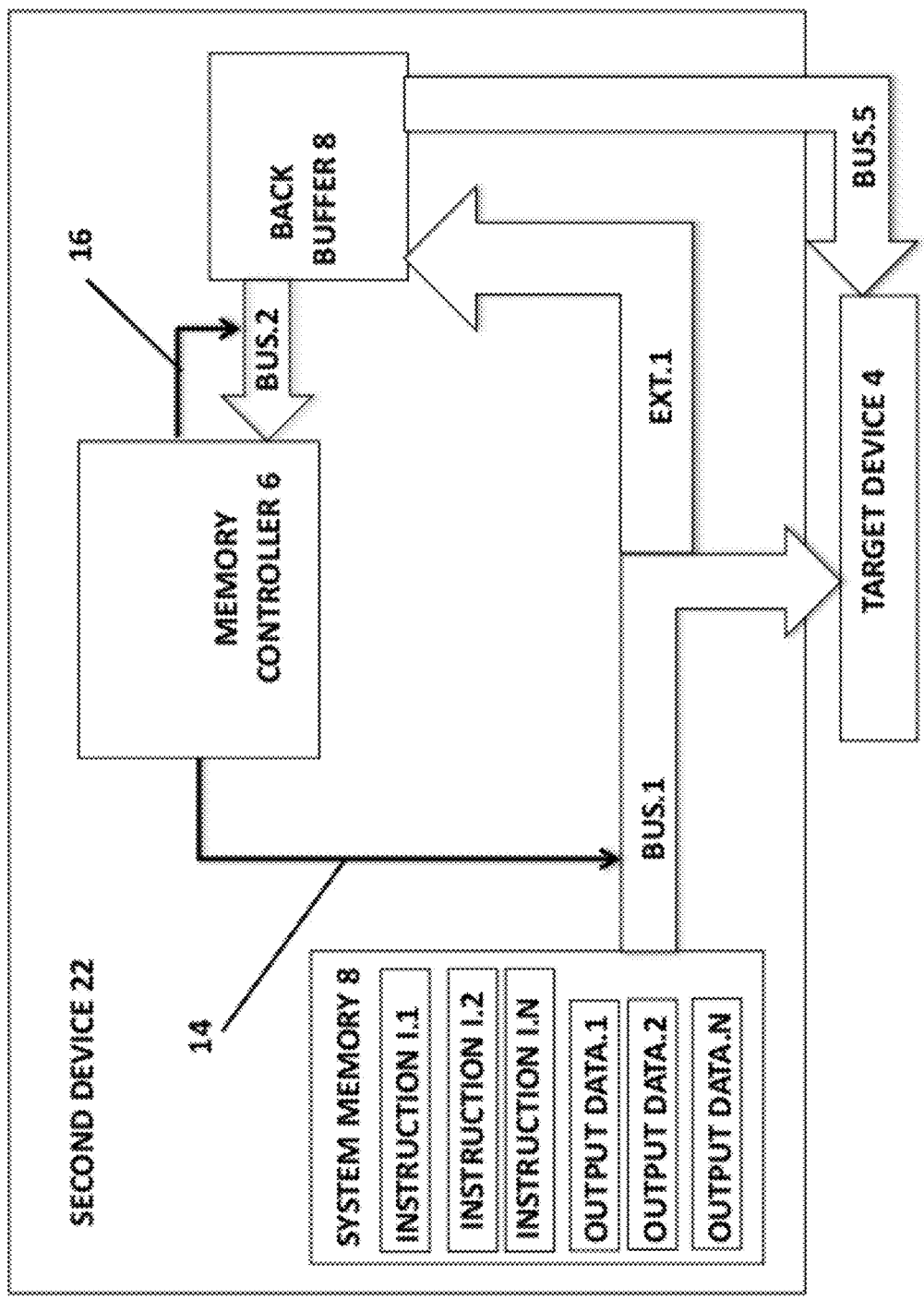
FIG. 9 is a functional block diagram of a second invented device that is designed in accordance with at least a second aspect of the present invention, wherein a target assertion bus communicatively couples the back buffer of FIG. 1 with the target device of FIG. 1, and the target assertion bus thereby enables the back buffer to assert configuration data provided in one or more instructions of FIG. 1 upon the target device 4.

Referring now generally to the Figures and particularly to FIG. 9, FIG. 9 is a functional block diagram of a second invented device 22 that is designed in accordance with at least a second aspect of the present invention, wherein a target assertion bus BUS.5 communicatively couples the back buffer 10 with the target device 4, and the target assertion bus BUS.5 (or, "fifth bus" BUS.5) thereby enables the back buffer 10 to assert configuration data provided in one or more instructions I.1-I.N upon the target device 4.

Figure 10:
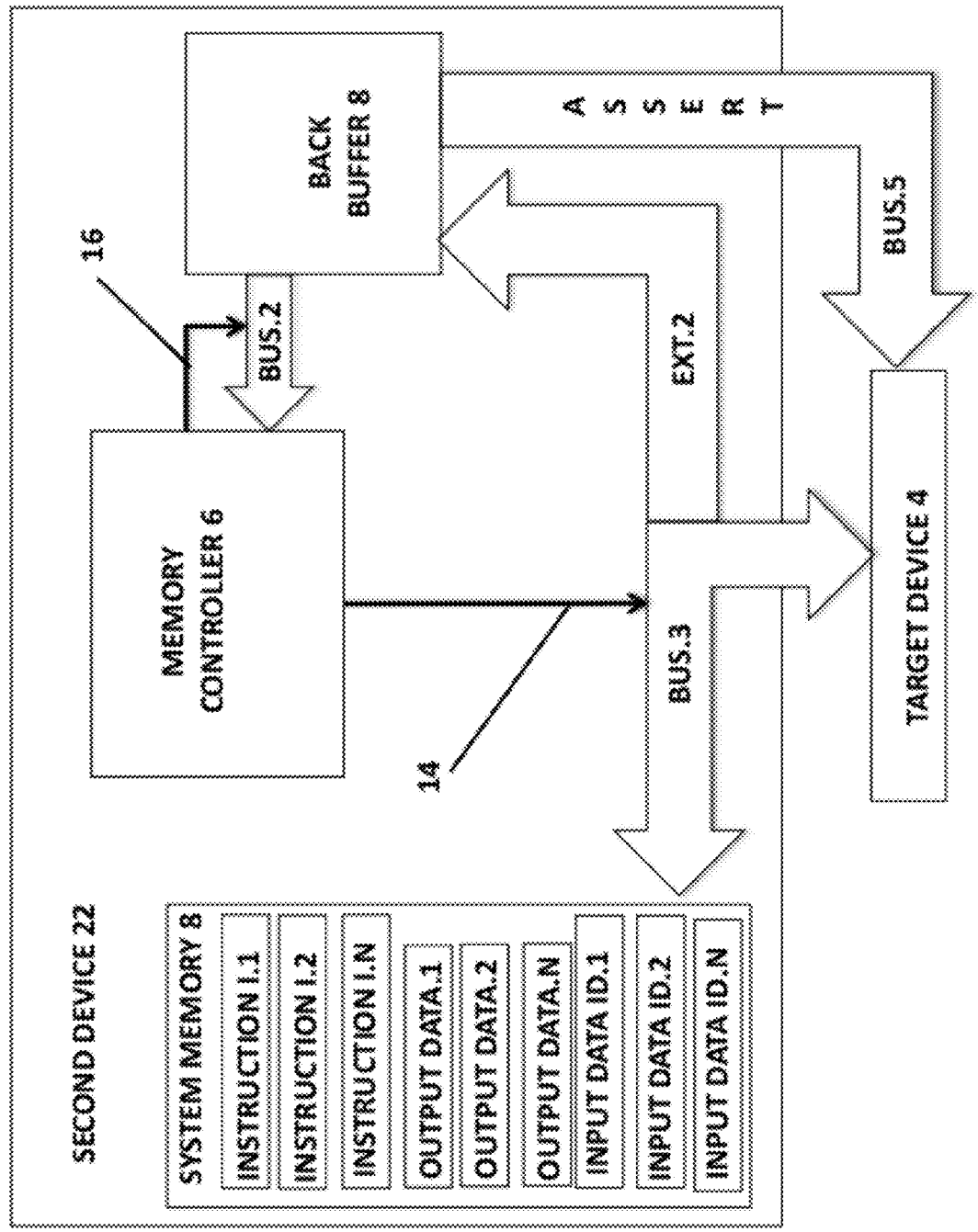
FIG. 10 is a functional block diagram of a second version of the second invented device of FIG. 9 that is designed in additional accordance with at least a third aspect of the present invention, wherein (a.) the system memory of FIG. 1 is bi-directionally coupled with the target circuit of FIG. 1 by the b-directional third bus of FIG. 5, and the memory controller of FIG. 1 is adapted to direct the third bus receive input data from the target device 4 of FIG. 1 and to write the input data to the system memory of FIG. 1.

Referring now generally to the Figures and particularly to FIG. 10, FIG. 10 is a functional block diagram of a second version of the second invented device 22 that is designed in additional accordance with at least a third aspect of the present invention, wherein (a.) the system memory 8 is bi-directionally coupled with the target circuit 4 by the b-directional third bus BUS.3; and (b.) the memory controller 6 is adapted to direct the third bus BUS.3 receive input data ID.1-ID.N from the target device 4 and to write the input data ID.1-ID.N to the system memory 8.

The memory controller writes output data DATA.1-DATA.N read from the system memory 8 into the target device 4 via the third bus BUS.3. In addition, the memory controller 6 directs the third bus BUS.3 to write input data ID.1-ID.N from the target device 4 via the third bus BUS.3 into the system memory 8.

Figure 11:
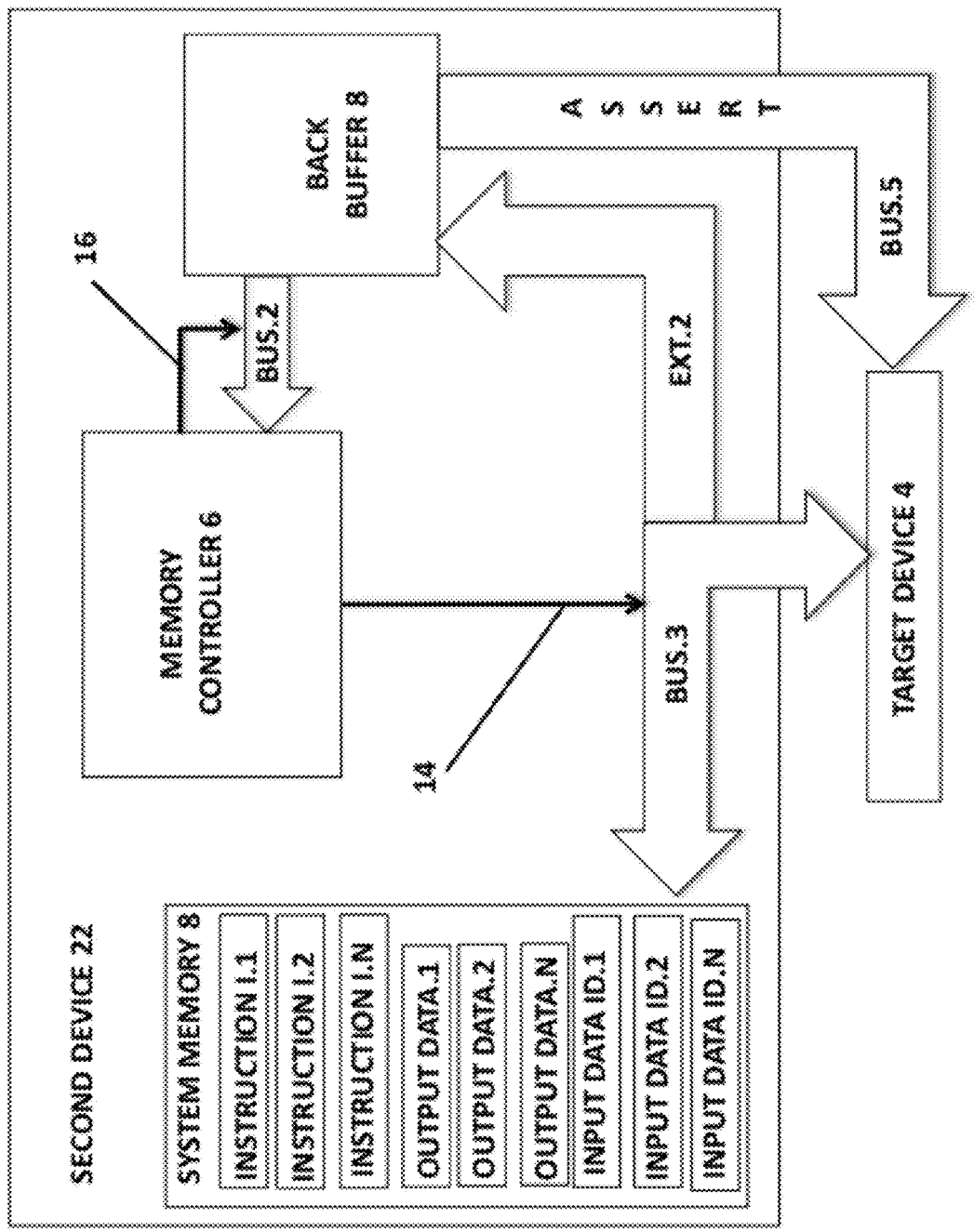
FIG. 11 is a functional block diagram of a third version of the second invented device of FIG. 9 that is designed in additional accordance with at least a fourth aspect of the present invention, wherein the memory controller of FIG. 1 is adapted or configured to direct the third bus of FIG. 5 to write elements of one or more instructions of FIG. 2 from the system memory of FIG. 1 and to the target device of FIG. 1.

Referring now generally to the Figures and particularly to FIG. 11, FIG. 11 is a functional block diagram of a third version of the second invented device 22 that is designed in additional accordance with at least a fourth aspect of the present invention, wherein the memory controller 6 is adapted or configured to direct the third bus BUS.3 to write elements of one or more instructions I.1-I.N, i.e., elements of one of one or more transfer configuration data portions T.1 and/or elements of one or more fetch configuration data portions F.1 from the system memory 8 and to the target device 4.

Figure 12:
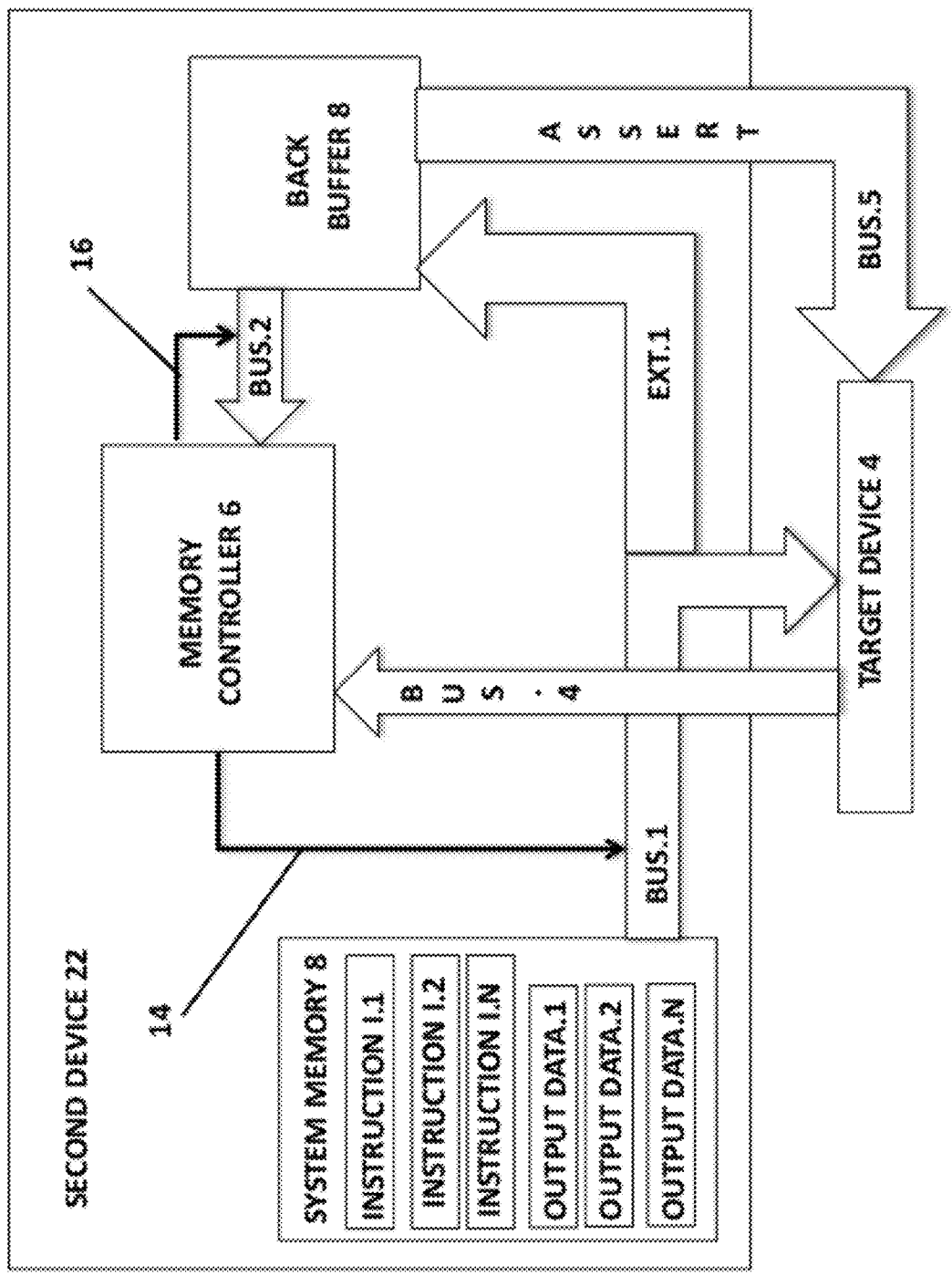
FIG. 12 is a functional block diagram of a fourth version of the second invented device of FIG. 9 that is designed in additional accordance with at least a fifth aspect of the present invention, wherein the memory controller of FIG. 1 is further adapted and/or configured to receive assertions of configuration data of FIG. 2 from the target device of FIG. 1 via the fourth bus of FIG. 6.

Referring now generally to the Figures and particularly to FIG. 12, FIG. 12 is a functional block diagram of a fourth version of the second invented device 16 that is designed in additional accordance with at least a fifth aspect of the present invention, wherein the memory controller 6 is further adapted and/or configured to receive assertions of configuration data, e.g., transfer configuration data portions T.1 and/or elements of one or more fetch configuration data portions F.1, from the target device 4 via the fourth bus BUS.4.

Figure 13:
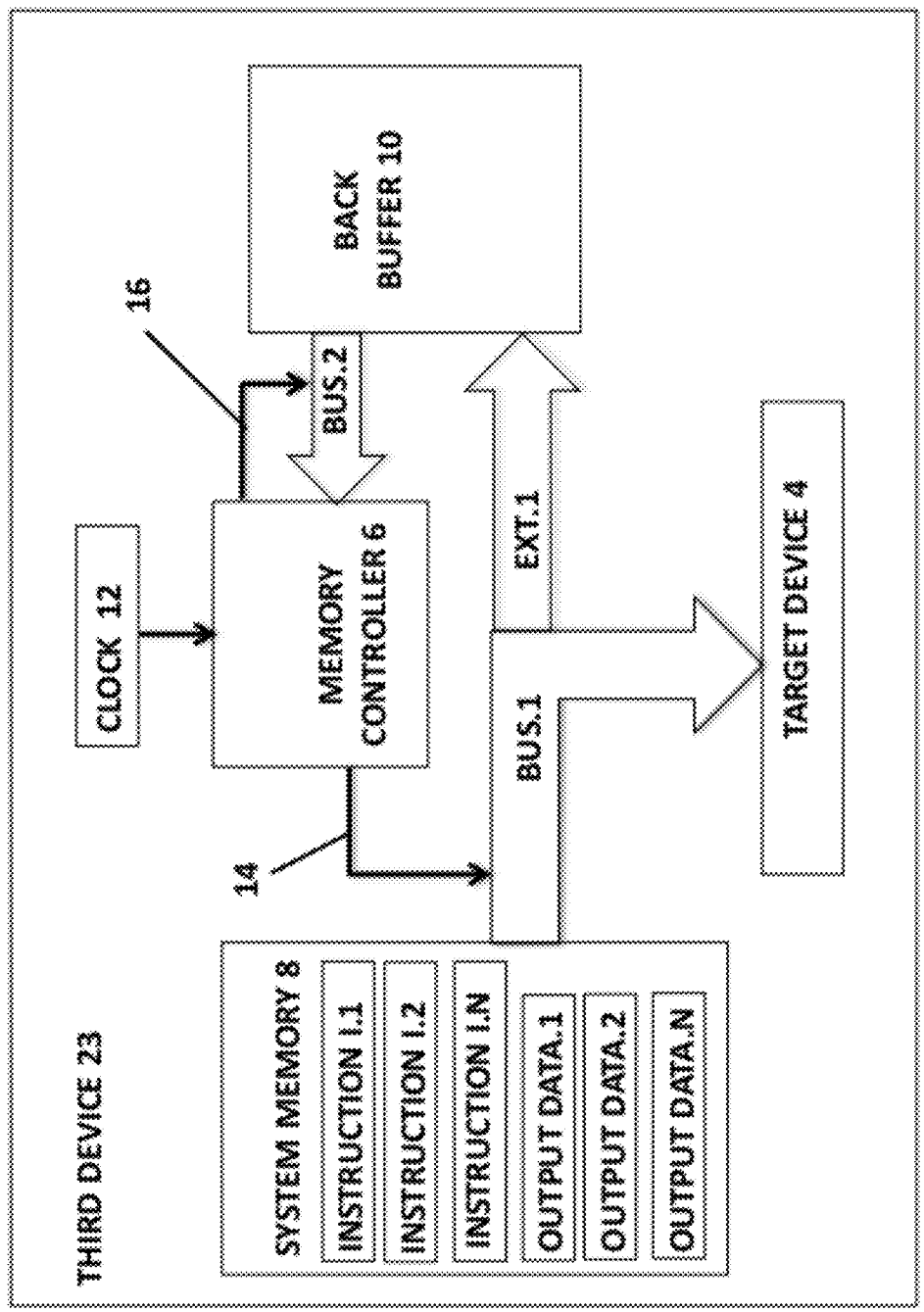
FIG. 13 is a functional block diagram of a third invented device (or, "third device") that further comprises the target device of FIG. 1, whereby source output data of FIG. 1 is written from the system memory of FIG. 1 and to the target device of FIG. 1 under the direction of the memory controller of FIG. 1 and in accordance with the instructions of FIG. 2.

Referring now generally to the Figures and particularly to FIG. 13, FIG. 13 is a functional block diagram of a third invented device 23 (hereinafter, "third device" 23) that further comprises the target device 4, whereby source output data DATA.1-DATA.N is written from the system memory 6 and to the target device 4 under the direction of the memory controller 6 and in accordance with the instructions I.1-I.N. The memory controller 6 is a configurable logic circuit that adapted to execute the instructions I.1-I.N and to cause the system memory 8 to write output data DATA.1-DATA.N from the system memory 8. The third device 23 includes the target device 4, the memory controller 6, the system memory 8, and the back buffer 10.

The third device 23 may comprise a semiconductor die and/or be or be comprised within a packaged electronic integrated circuit device in certain alternate preferred embodiments of the invented device 2. The target device 4 may comprise a semiconductor die and/or be or comprised within a packaged electronic integrated circuit device in certain alternate preferred embodiments of the method of the present invention.

The third device 23 includes the target device 4, the memory controller 6, the system memory 8, the back buffer 10, the clock 12, the first plurality of control lines 14, the second plurality of control lines 16, the first communications bus BUS.1 and the second communications bus BUS.2. The memory controller 6 is a configurable logic circuit that is adapted to (a.) direct data flow through the first communications bus BUS.1 by means of the first plurality of control lines 14; and (b.) direct data flow through the second communications bus BUS.2 by means of the second plurality of control lines 16.

The first bus BUS.1 comprises a first extension communications bus EXT.1 that supports transfer of instructions I.1-I.N to the back buffer 10. The memory controller 6 directs the first communications bus BUS.1 (hereinafter, "first bus" BUS.1) by means of the first plurality of control lines 14 to (a.) write instructions I.1-I.N from the system memory 8 and to the back buffer 10; and (b.) write output data DATA.1-DATA.N from the system memory 8 to and to the target device 4. The memory controller 6 directs the second communications bus BUS.2 (hereinafter, "second bus" BUS.2) by means of the second plurality of control lines 16, and directs the second bus BUS.1 to assert instructions I.1-I.N from the back buffer 10 and onto the memory controller 6 itself. The direction of the transfer of output data DATA.1-DATA.N by the memory controller 6 is performed by the memory controller in accordance with one or more instruction I.1-I.N originally stored in the system memory 8 and sequentially asserted by the back buffer 10 onto the memory controller 6. In addition, an assertion of one instruction I.1-I.N by the back buffer 10 onto the memory controller 6 causes the memory controller 6 to transfer the succeeding instruction I.1-I.N from the system memory 8 to the back buffer 10. For example, the assertion of the first instruction I.1 by the back buffer 10 onto the memory controller 6, causes the memory controller to both (a.) direct the first bus to write at least one output data DATA.1-DATA.N from the system memory 8 to the target device 4; and (b.) write the second instruction I.2 from the system memory 8 and into the back buffer 10. The second instruction I.2 is then asserted by the back buffer 10 onto the memory controller 6 and a third instruction I.3 is read into the back buffer 8; whereupon the third instruction is next asserted by the back buffer 10 onto the memory controller 6.

The clock 12 is coupled to the memory controller 6 and is applied to synchronize the operations of the memory controller 6, the system memory 8 and the back buffer 10 as required by certain alternate and/or optional aspects of the method of the present invention. The clock 12 may alternatively be comprised in whole or in part within an element or circuit of the first device 2, such as the memory controller 6.

Figure 14:
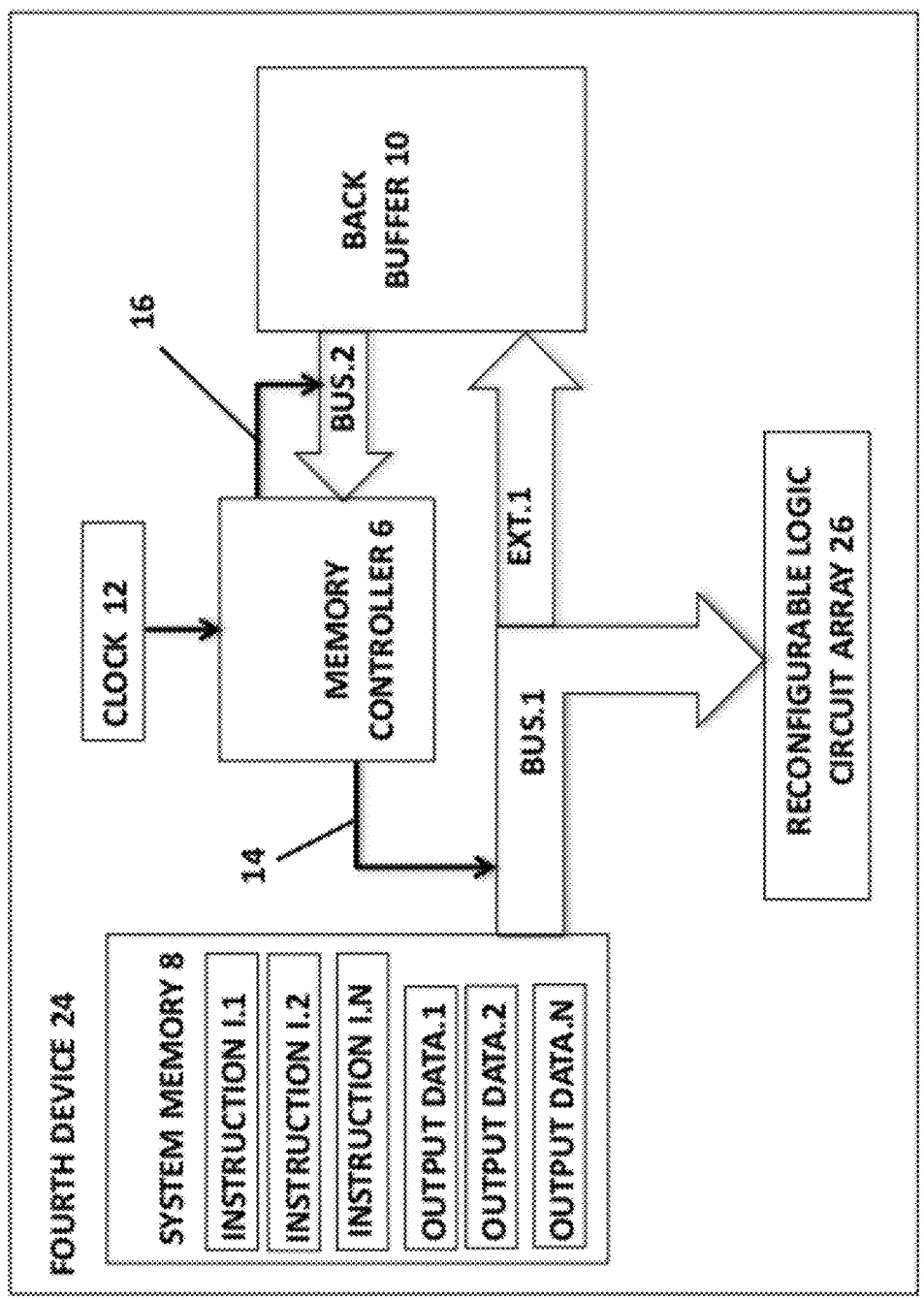
FIG. 14 is a functional block diagram of a fourth invented device (hereinafter, "fourth device" 24) that further comprises the a reconfigurable logic circuit array, whereby source output data of FIG. 2 is transferred from the system memory of FIG. 1 and to the reconfigurable logic circuit array.

Referring now generally to the Figures and particularly to FIG. 14, FIG. 14 is a functional block diagram of a fourth invented device 24 (hereinafter, "fourth device" 24) that further comprises the a reconfigurable logic circuit array 26, whereby source output data DATA.1-DATA.N is transferred from the system memory 8 and to the reconfigurable logic circuit array 26. The reconfigurable logic circuit array 26 may be or include a reprogrammable logic unit as disclosed in U.S. Pat. No. 7,840,777 issued on Nov. 23, 2011 to inventor Robert Mykland and titled "Method and apparatus for directing a computational array to execute a plurality of successive computational array instructions at runtime".

The fourth device 26 may comprise a semiconductor die and/or be or be comprised within a packaged electronic integrated circuit device in certain alternate preferred embodiments of the invented device 2. The target device 4 may comprise a semiconductor die and/or be or comprised within a packaged electronic integrated circuit device in certain alternate preferred embodiments of the method of the present invention.

The fourth device 26 includes the reconfigurable logic circuit array 26, the memory controller 6, the system memory 8, the back buffer 10, the clock 12, the first plurality of control lines 14, the second plurality of control lines 16, the first communications bus BUS.1 and the second communications bus BUS.2. The memory controller 6 is a configurable logic circuit that is adapted to (a.) direct data flow through the first communications bus BUS.1 by means of the first plurality of control lines 14; and (b.) direct data flow through the second communications bus BUS.2 by means of the second plurality of control lines 16.

The first bus BUS.1 comprises a first extension communications bus EXT.1 that supports transfer of instructions I.1-I.N to the back buffer 10. The memory controller 6 directs the first communications bus BUS.1 (hereinafter, "first bus" BUS.1) by means of the first plurality of control lines 14 to (a.) write instructions I.1-I.N from the system memory 8 and to the back buffer 10; and (b.) write output data DATA.1-DATA.N from the system memory 8 to and to the reconfigurable logic circuit array 26. The memory controller 6 directs the second communications bus BUS.2 (hereinafter, "second bus" BUS.2) by means of the second plurality of control lines 16, and directs the second bus BUS.1 to assert instructions I.1-I.N from the back buffer 10 and onto the memory controller 6 itself. The direction of the transfer of output data DATA.1-DATA.N by the memory controller 6 is performed by the memory controller 6 in accordance with one or more instruction I.1-I.N originally stored in the system memory 8 and sequentially asserted by the back buffer 10 onto the memory controller 6. In addition, an assertion of one instruction I.1-I.N by the back buffer 10 onto the memory controller 6 causes the memory controller 6 to transfer the succeeding instruction I.1-I.N from the system memory 8 to the back buffer 10. For example, the assertion of the first instruction I.1 by the back buffer 10 onto the memory controller 6, causes the memory controller to both (a.) direct the first bus to write at least one output data DATA.1-DATA.N from the system memory 8 to the reconfigurable logic array 26; and (b.) write the second instruction I.2 from the system memory 8 and into the back buffer 10. The second instruction I.2 is then asserted by the back buffer 10 onto the memory controller 6 and a third instruction I.3 is read into the back buffer 8; whereupon the third instruction is next asserted by the back buffer 10 onto the memory controller 6.

The clock 12 is coupled to the memory controller 6 and is applied to synchronize the operations of the memory controller 6, the system memory 8 and the back buffer 10 as required by certain alternate and/or optional aspects of the method of the present invention. The clock 12 may alternatively be comprised in whole or in part within an element or circuit of the first device 2, such as the memory controller 6.

Figure 15A:
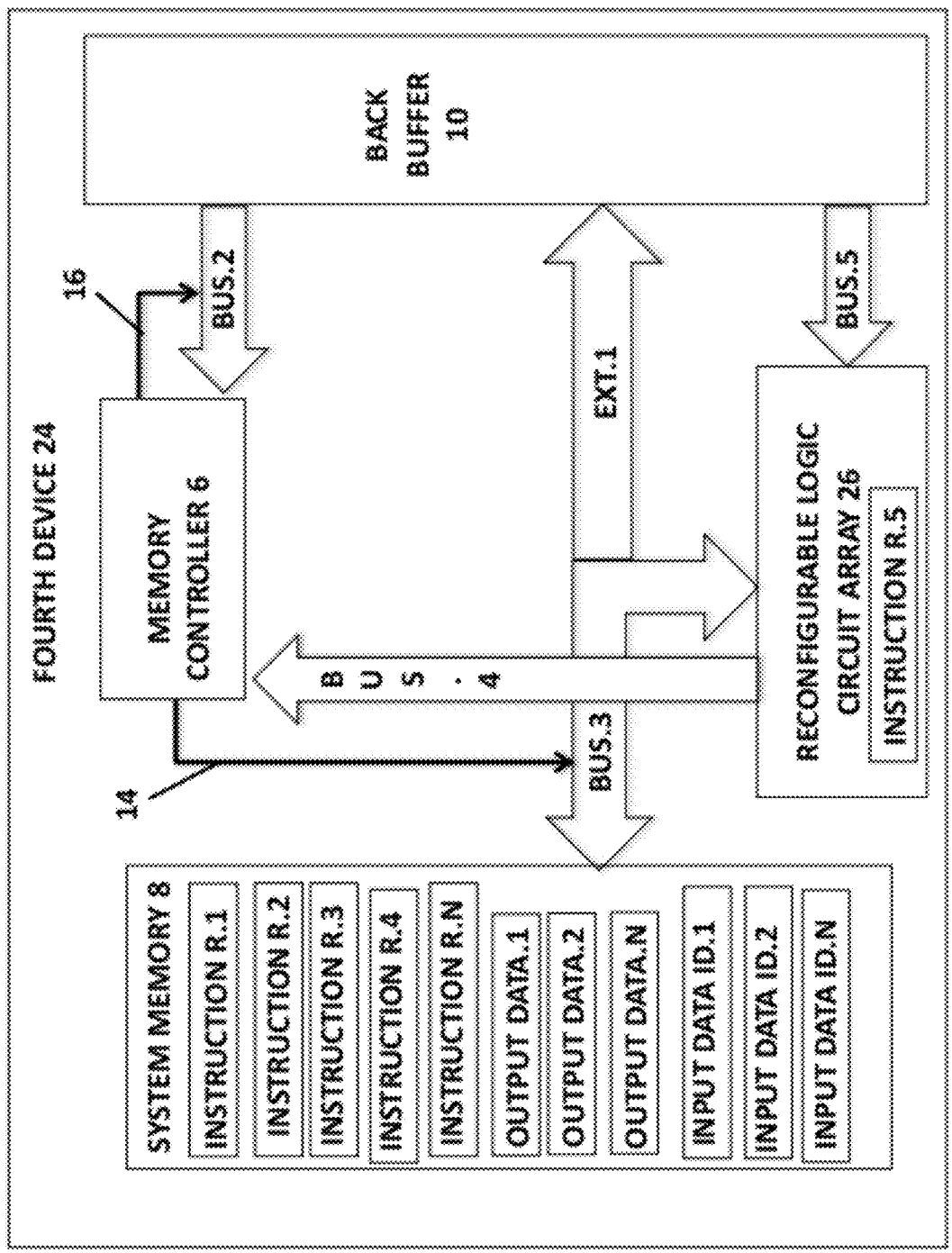
FIG. 15A is a functional block diagram of a second version of the fourth device of FIG. 14 that is designed in accordance with an additional aspect of the present invention and further comprises the fifth target assertion communications bus of FIG. 9 and optionally the bi-directional third bus of FIG. 5.

Referring now generally to the Figures and particularly to FIG. 15A, FIG. 15A is a functional block diagram of a second version of the fourth device 24 that is designed in accordance with an additional aspect of the present invention and further comprises a fifth bus BUS.5 and optionally the bi-directional third bus BUS.3.

The fifth bus BUS.5 communicatively couples the back buffer 10 with the reconfigurable logic circuit array 26 and thereby enables the back buffer 10 to assert reconfiguration data RC.1-RC.N provided in one or more reconfiguration instructions RI.1-RI.N upon the reconfigurable logic circuit array 26. The reconfigurable logic circuit array 26 is adapted and/or configured to at least partially configure the memory controller 6. The memory controller is bi-directionally coupled with the reconfigurable logic circuit array 26. The memory controller 6 is adapted and/or configured to direct the third bus BUS.3 to (a.) receive input data ID.1-ID.N from the reconfigurable logic circuit array 26 and to write the input data ID.1-ID.N to the system memory 8; and (b.) deliver output data DATA.1-DATA.N to the reconfigurable logic circuit array 26.

The fourth device 24 may further optionally comprise the fourth bus BUS.4, wherein the memory controller 6 is further adapted or configured to receive assertions of configuration data from the reconfigurable logic circuit array 26 via the fourth bus BUS.4. The fourth communications bus BUS.4 enables the reconfigurable logic circuit array 26 to assert upon the memory controller 6 some or all of one or more (a.) elements of memory controller reconfiguration instructions; (b.) fetch configuration data portion F.1; (c.) transfer configuration portions T.1. Optionally, alternatively or additionally, the third communications bus BUS.3 may be adapted to enable the reconfigurable logic circuit array 26 to transfer to the back buffer 10 some or all of one or more elements of one or more memory controller reconfiguration instructions R.5.

Figure 15B:
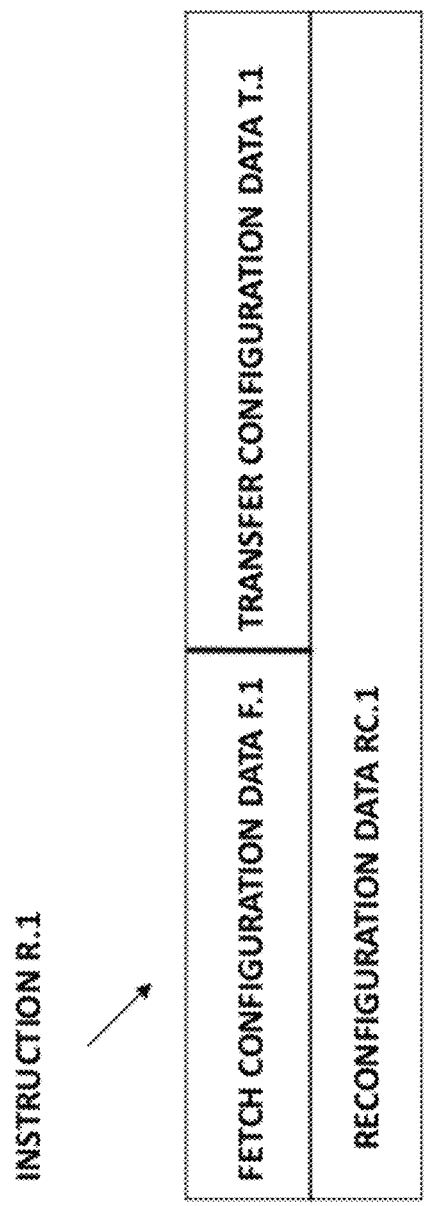
FIG. 15B is a diagram of an exemplary first configuration instruction that is formatted and populated with data in accordance with the second version of the fourth device of FIG. 15A.

Referring now generally to the Figures and particularly to FIG. 15B, FIG. 15B is a diagram of an exemplary first reconfiguration instruction R.1 that is formatted and populated with data in accordance with a fourth aspect of the method of the present invention. The transfer configuration data portion T.1 of the first reconfiguration instruction R.1 is asserted by the back buffer 10 upon the memory controller 6 to configure the memory controller 6 to read data from the system memory 8 and transfer the data to the target device 4. The fetch configuration data portion F.1 of the first instruction is asserted by the back buffer 10 upon the memory controller 6 to configure the memory controller 6 to (a.) fetch a next instruction, for example a second reconfiguration data R.2, from the system memory 8; and (b.) transfer the second instruction R.2 to the back buffer 10. A reconfiguration data RC.1 comprises data that will reconfigure the reconfigurable logic circuit array 26 when asserted by the memory controller 6 and/or the back buffer 10.

Figure 16:
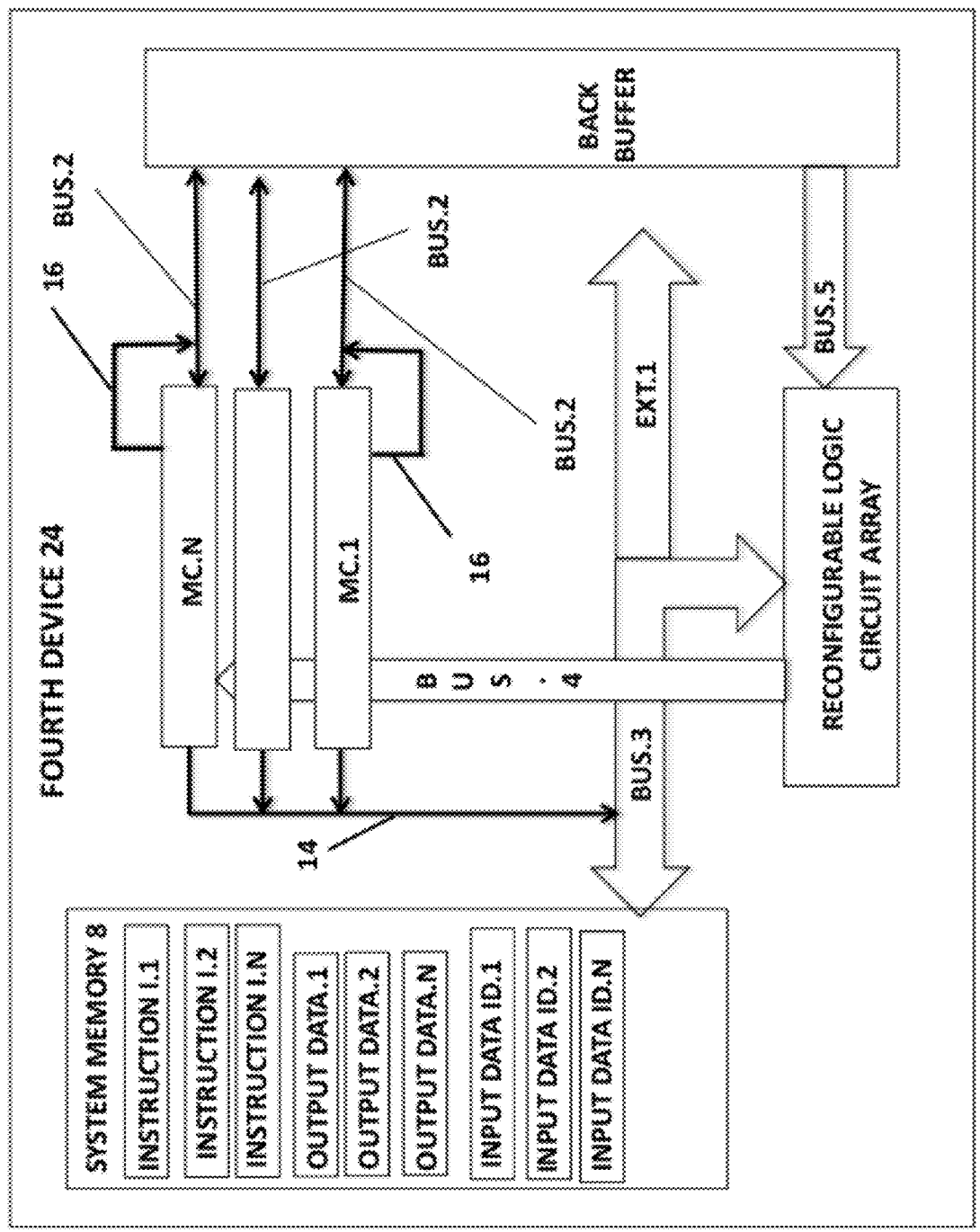
FIG. 16 is a functional block diagram of a third version of the fourth device of FIG. 14 comprising a plurality of memory controllers of FIG. 1, wherein each memory controller is coupled with the back buffer of FIG. 1 by one or more second buses of FIG. 1.

Referring now generally to the Figures and particularly to FIG. 16, FIG. 16 is a functional block diagram of a third version of the fourth device 24 comprising a plurality of memory controllers MC.1-MC.N, wherein each memory controller MC.1-MC.N provides aspects of the functionality of the memory controller 6, and each memory controller MC.1-MC.N is coupled with the back buffer 10 by one or more second buses BUS.2. Each memory controller MC.1-MC.2 is adapted to (a.) receive assertions of instructions I.1-I.N & R.1-R.N from the back buffer 10; (b.) direct the third bus BUS.3 to write instructions I.1-I.N & R.1-R.N into the back buffer 10; (c.) direct the third bus BUS.3 to write output data DATA.1-DATA.N to the reconfigurable logic circuit array 26; (e.) direct the third bus BUS.3 to receive input date ID.1-ID.N from the reconfigurable logic circuit array 26; (f.) direct the third bus BUS.3 to write input data ID.1-ID.N received from the reconfigurable logic circuit array 26 into the system memory 8; and/or (g.) receive one or more instructions I.1-I.N from the reconfigurable logic circuit array 26 via the fourth bus BUS.4, wherein the memory controller 6 is adapted and/or configured to receive configuration data of one or more instructions I.1-I.N, e.g., transfer configuration data portions T.1 and/or elements of one or more fetch configuration data portions F.1, from the target device 4 via the fourth bus BUS.4.

Figure 17:
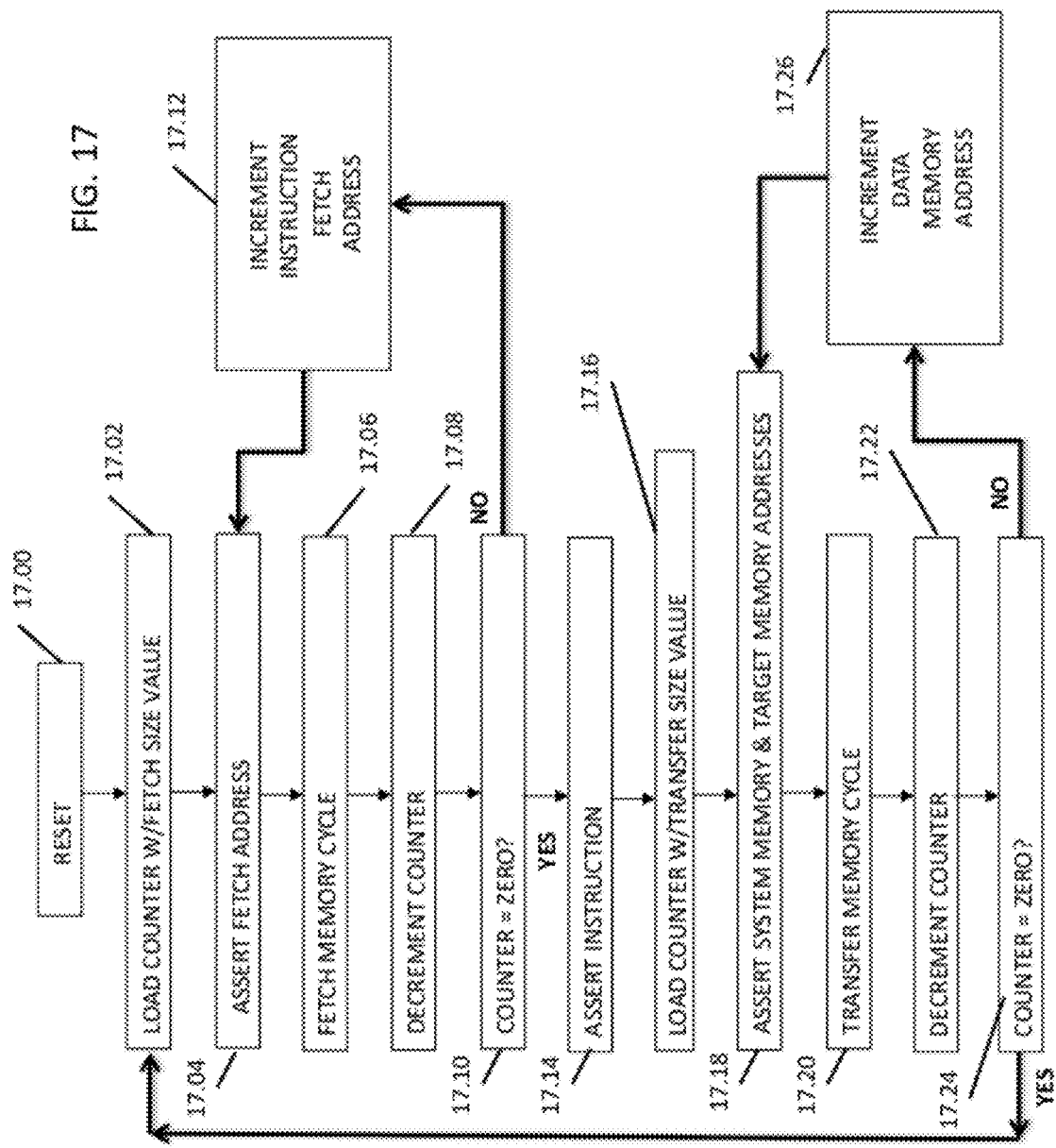
FIG. 17 is a flow chart of an aspect of operation of the memory controller of FIG. 1.

Referring now generally to the Figures and particularly to FIG. 17, FIG. 17 is a flow chart of an aspect of operation of the memory controller 6 wherein a counter 6.02 of the memory controller is applied to insure a complete transfer of an instruction I.1-I.N to the back buffer 10 by a cycling through of steps 17.04 through 17.12, and then a transfer of an output data DATA.1-DATA.N from the system memory 8 to the target device 4 by a cycling through of steps 17.18 through 17.26, wherein the instruction I.1-I.N transferred in the most previously executed cycle of the method of FIG. 17 directs the memory controller 6 as to which output data DATA.1-DATA.N shall be transferred in the instant cycling through of steps 17.18 through 17.26. It is understood that the instruction loaded into the back buffer 10 in the execution of the cycling of steps 17.04 through 17.12 is asserted by the back buffer 10 onto the memory controller 6 in step 17.14, whereby both (a.) the next execution of the cycle of steps 17.16 through 17.26, wherein an output data DATA.1-DATA.N is written from the system memory 8 to the target device 4; and (b.) a following execution of the cycle of steps 17.04 through 17.12, wherein a succeeding instruction I.1-I.N is written from the system memory 8 and into the back buffer 10.

Referring now to the output data writing steps 17.02 through 17.12, after the first counter 6.02 is first reset in step 17.00, the first counter 6.02 is loaded with an instruction fetch size memory value (hereinafter, "fetch size value"), the fetch size value being equal to the number addressable memory locations which are dedicated to store a selected instruction I.1-I.N. An initial fetch memory address of the system memory 8 (hereinafter, "fetch memory address"), at where a first element of the selected instruction I.1-I.N is stored, is then asserted in step 17.06 by the memory controller 6 by means of either the first bus BUS.1 or the third bus BUS.3 upon the system memory 8. The fetch size value of the first counter 6.02 is then decremented in step 17.08. In step 17.10 the memory controller 6 determines whether the fetch size value has been reduced to a zero or null value. When the memory controller 6 determines in step 17.10 that the fetch size value has not yet been reduced to a zero or null value, the memory controller proceeds on to step 17.12 and to increment the fetch memory address of the last assertion of step 17.04, and then proceeds form step 17.12 to an additional execution of step 17.04 and by writing an additional element of the currently selected instruction I.1-I.N from a succeeding memory address of the system memory 8 and to the back buffer 10, the succeeding memory address having an address equal to the newly incremented fetch memory address as incremented in the most recent execution of step 17.12. The fetch memory cycle 17.04 through 17.12 is repeated until the selected instruction I.1-I.N is fully written into the back buffer 10 by means of the first bus BUS.1 or the third bus BUS.3.

When the memory controller 6 determines in step 17.10 that the fetch size value stored in the first counter 602 is reduced to a zero or null value, or is lesser than a zero or null value, the memory controller 6 directs the back buffer 10 to assert the selected instruction I.1-I.N upon the memory controller 6 itself. In one optional aspect of the invented method of FIG. 17, the memory controller 6 applies the second plurality of control lines 16 to cause the most recently selected instruction I.1-I.N that is most recently written into the back buffer 10 to be asserted onto the memory controller 6 from the back buffer 10 via the second bus BUS.2.

The initial fetch memory address value provided from the instant instruction I.1-I.N being executed and applied in the first execution of step 17.02 in the course of performing the instant instruction I.1-I.N identifies a memory location of the system memory 8 where a first element of a following instruction I.1-I.N is stored. The initial fetch memory address value stored in the first execution of step 17.02 in the course of the instant instruction I.1-I.N that is applied in the first execution of the instant instruction I.1-I.N identifies the number of discrete addressable memory locations within the system memory 8 that the following instruction I.1-I.N occupies. It is understood that device 2 is directed by the instant instruction to fetch and then execute the following instruction I.1-I.N when the following instruction I.1-I.N has been written into the back buffer 10 and the back buffer 10 then asserts this following instruction I.1-I.N upon the memory controller 6.

Figure 20:
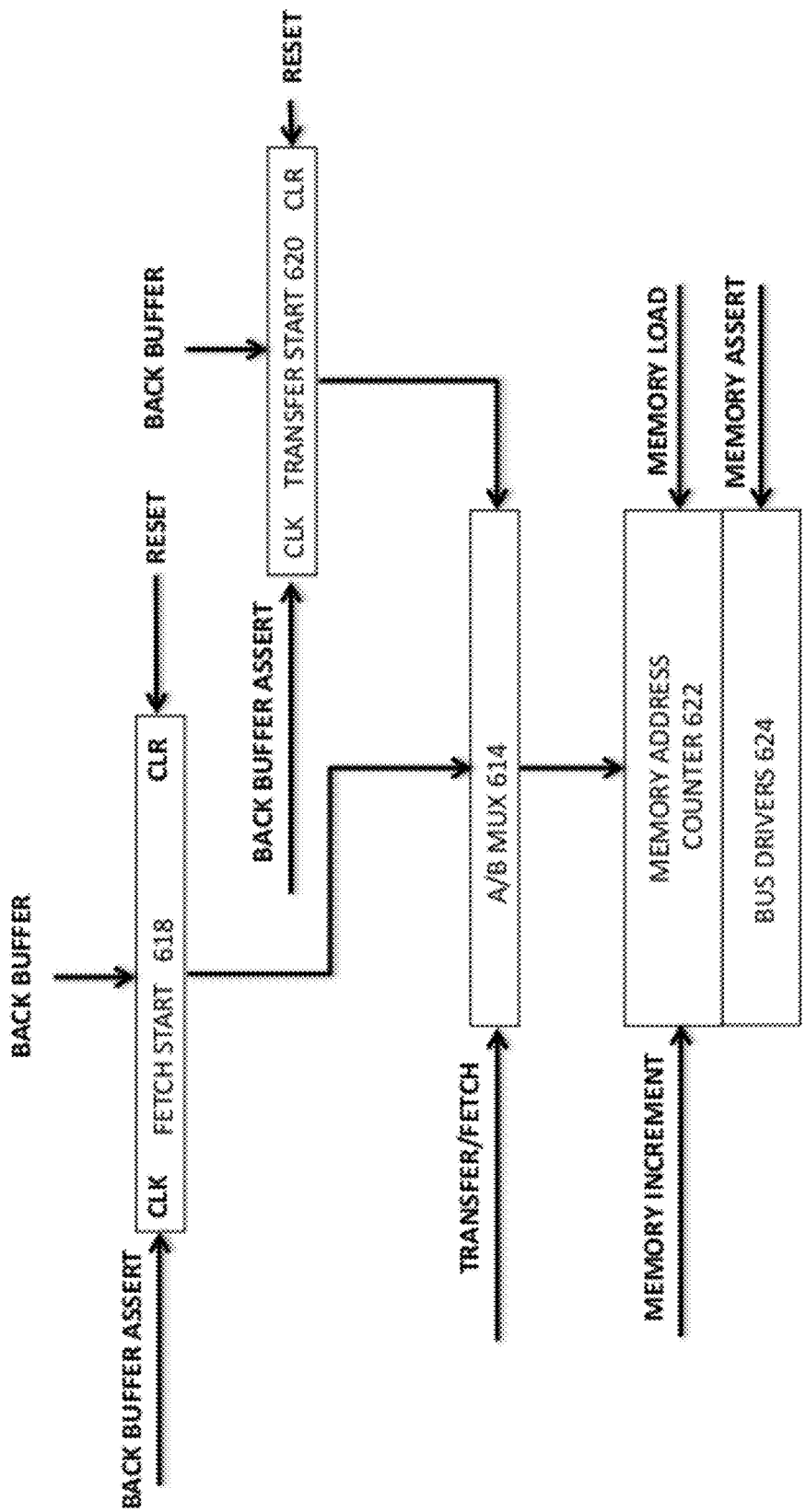
FIG. 20 is a functional block diagram of a memory address circuit of the memory controller of FIG. 1 that includes schematic representations of hardware elements of the memory controller and further and indicates several signals and signal communication pathways.

It is understood that the memory address counter 622 of FIG. 20 increments any stored value, e.g., a transfer size value or an fetch size value, as per steps 17.12 and 17.26. In particular, the memory address counter 622 receives an initial value fetch memory address value in step 17.04 at the first execution of step 17.04 within the execution of each instruction I.1-I.N, and proceeds to increment this initial memory address value in the cycles of steps 17.04 through 17.12 performed in the execution of the instant instruction I.1-I.N. When a following instruction I.1-I.N is executed, a new instruction I.1-I.N provides a new initial fetch memory address and this new fetch memory address value is decremented in the cycles of steps 17.04 through 17.12 performed in the execution of the instant instruction I.1-I.N.

In accordance with the selected instruction I.1-I.N asserted in step 17.14, the memory controller 6 loads an initial memory transfer size value of a selected output data DATA.1-DATA.N into the first counter in step 17.16. An initial data memory address of the system memory 8, at where a first output data element of the output data DATA.1-DATA.N indicated by the currently executing instruction I.1-I.2 is stored, is then asserted in step 17.18 by the memory controller 6 by means of either the first bus BUS.1 or the third bus BUS.3 upon the system memory 8.

Furthermore, an initial target memory address of the target device 4, at where the first output data element of the output data DATA.1-DATA.N is to be written is provided by the instant instruction I.1-I.N in step 17.18, is also then asserted in step 17.18 by the memory controller 6 by means of either the first bus BUS.1 or the third bus BUS.3 upon the target device 4.

The addressed output data element of the selected output data DATA.1-DATA.N is then written in step 17.20 from the system memory 8 to the target address of the target device 4 in accordance with the asserted instruction of step 17.14 by means of either the first bus BUS.1 or the third bus BUS.3. The memory transfer size value is decremented in step 17.22.

The memory controller 6 determines in step 17.24 whether the memory transfer size value stored in the first counter 6.02 is equal to a zero or a null value, or is greater than a zero or null value. When the memory controller 6 determines in step 17.24 that the memory transfer size value has not been reduced to be equal to or lesser than a zero or a null value, the memory controller proceeds from step 17.24 to step 17.26 wherein the data memory address is incremented and another execution of step 17.18 is instantiated by assertion of the newly incremented data memory address upon the first bus BUS.1 or the third bus BUS.3. The memory controller 6 proceeds on from to repeatedly execute the cycle of steps 17.18, an both decrementing the transfer size value in each execution of step 17.22 and incrementing both the data memory read address of the system memory 8 and the target device write address in each execution of step 17.26, until the memory controller 6 determines in step 17.24 that the transfer memory size value has been reduced to a null or zero value, or to below a null or zero value.

When the memory controller 6 determines in step 17.24 that the transfer size value has been reduced to a null or zero value, or to below a null or zero value, the memory controller proceeds to step 17.00, and therefrom to load a following instruction I.1-I.N from the system memory 8 and into the back buffer in an additional execution of steps 17.02 through 17.12. It is understood that in the execution of step 17.02 through 17.12 that the memory controller is action in accordance with the instruction I.1-I.N that was asserted in the most recent execution of step 17.14.

As noted above, it is understood that the memory address counter 622 of FIG. 20 increments any stored value, e.g., a transfer size value or an fetch size value, as per steps 17.12 and 17.26. In particular, the memory address counter 622 receives an initial value output data memory read address value of the system memory 6 in step 17.18 at the first execution of step 17.18 within the execution of each instruction I.1-I.N, and proceeds to increment this initial output data memory read address value in the cycles of steps 17.18 through 17.26 performed in the execution of the instant instruction I.1-I.N. When a following instruction I.1-I.N is executed, a new instruction I.1-I.N provides a new initial output data read memory address and this output data read memory address is decremented in the cycles of steps 17.04 through 17.12 performed in the execution of the instant instruction I.1-I.N.

Figure 18:
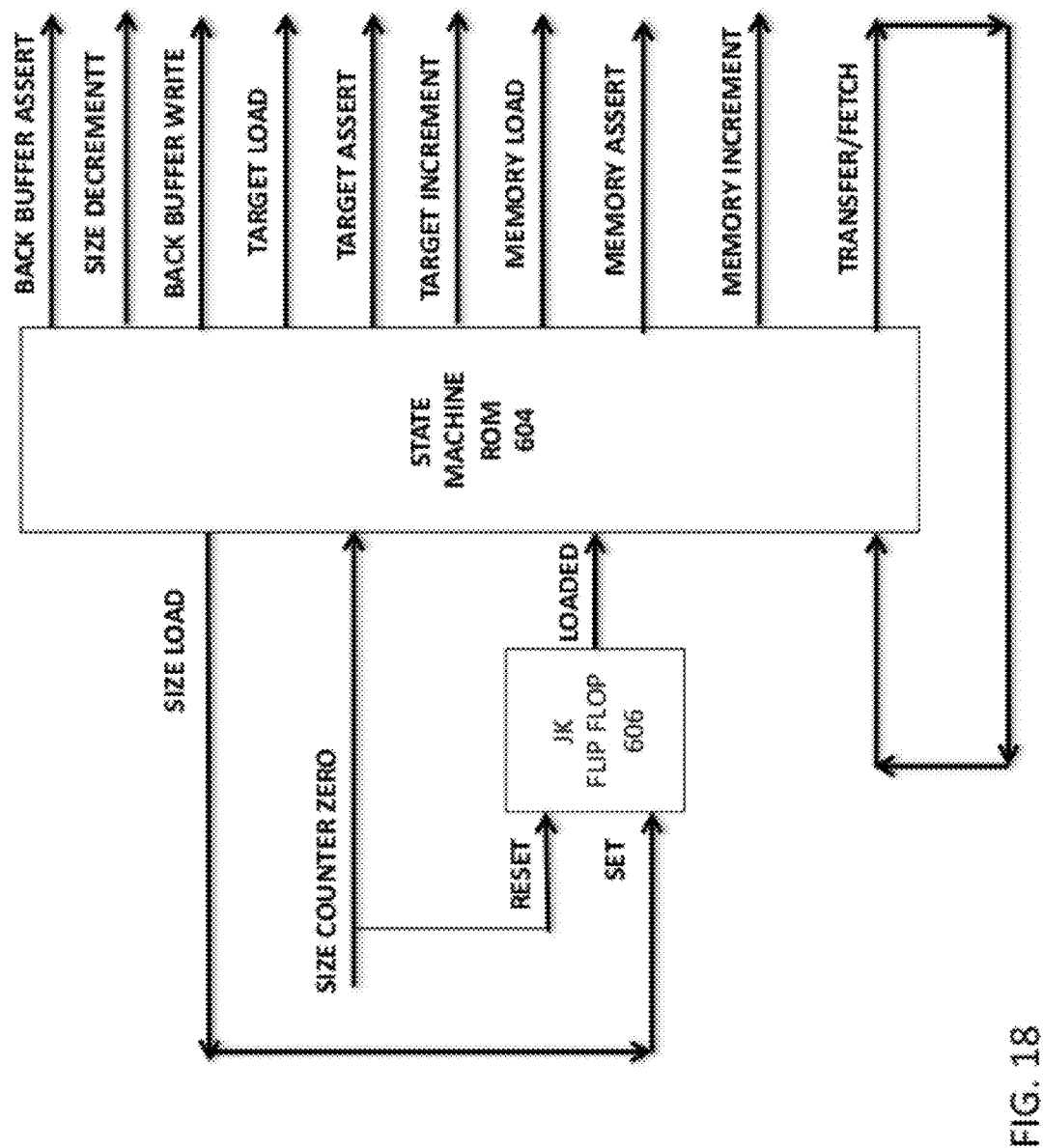
FIG. 18 is a functional block diagram that presents a state machine read-only memory and a JK flip flop circuit of the memory controller of FIG. 1 and further identifies a plurality of control and signals and signal communication pathways.

Referring now generally to the Figures and particularly to FIG. 18, FIG. 18 is a functional block diagram of elements of the memory controller 6 and that presents a state machine read-only memory 604 and a JK flip flop circuit 606 and further identifies a plurality of control signals and signal communication pathways. It is understood that in certain alternate aspects of the method of the present invention a signal may include status information, a control signal, data, and/or a combination of one or more control signals, data and status information.

The JK flip flop circuit 606 (hereinafter, "JK" 606) accepts a SIZE LOAD signal transmitted from the state machine read-only memory 604 (hereinafter, "ROM" 604) as a SET signal. The JK 606 additionally receives a SIZE COUNTER ZERO signal as a rest signal, and generates an output LOADED signal on the basis of the SIZE LOAD and SIZE COUNTER ZERO signals received by the JK 604 as input signals. The LOADED output signal from the JK 604 is transmitted to the ROM 604. It is noted that the SIZE COUNTER ZERO signal is provided as an input signal to both the JK 606 and the ROM 604.

In addition to the SIZE LOAD signal is sent to the JK 606, the ROM 604 also generates the following output signals: BACK BUFFER ASSERT, SIZE DECREMENT, BACK BUFFER WRITE, TARGET LOAD, TARGET ASSERT, TARGET INCREMENT, MEMORY LOAD, MEMORY ASSERT, MEMORY INCREMENT, AND TRANSFER/FETCH. The TRANSFER/FETCH signal is delivered back into the ROM 604 as input signal.

In the each instruction fetch transfer cycle, i.e., steps 17.02-17.10, performed in the execution of each instruction I.1-I.N, steps two control signals contain information provided in a same instant instruction I.1-I.N being executed.

Figure 19:
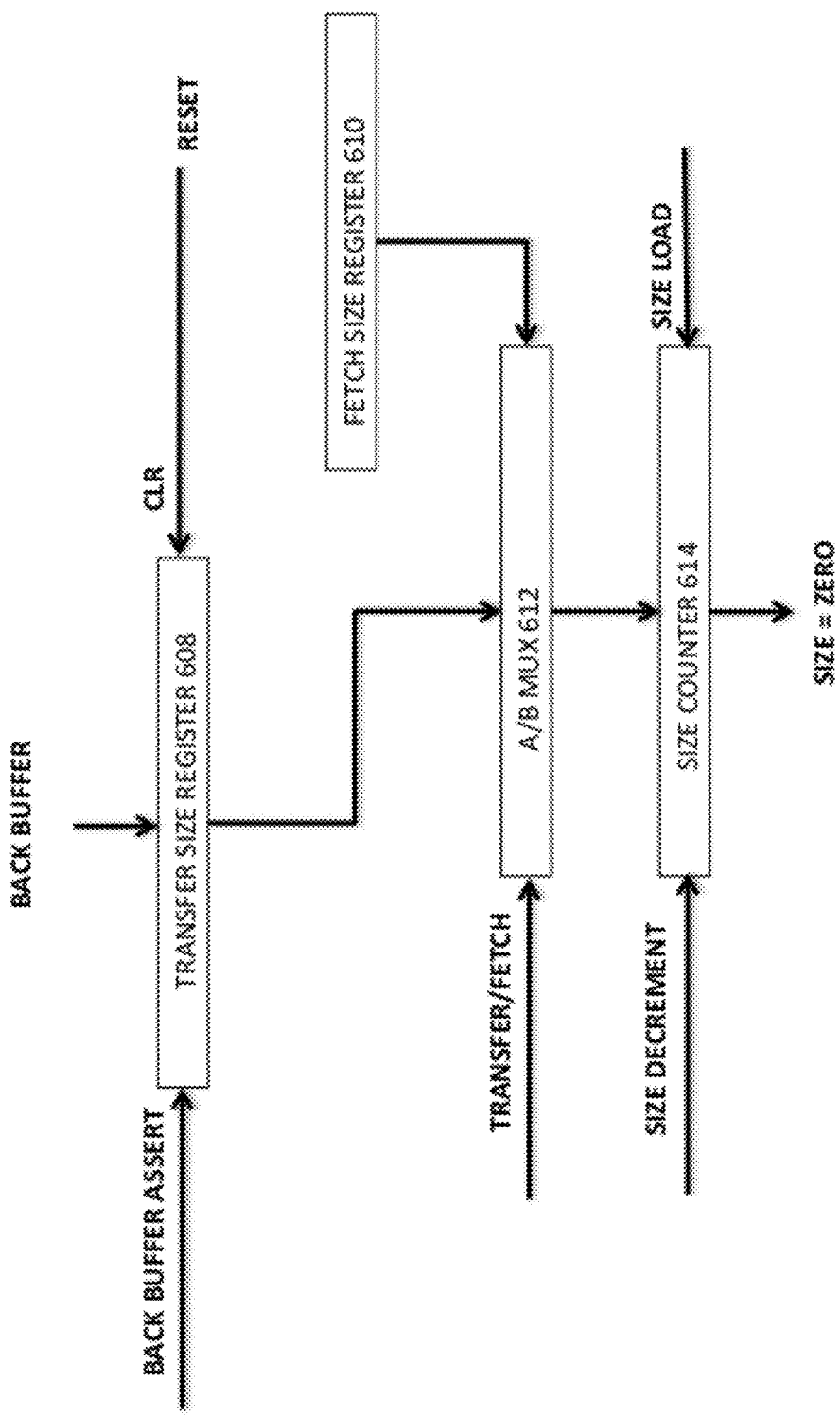
FIG. 19 is a functional block diagram of a size counter circuit of the memory controller of FIG. 1.

Referring now generally to the Figures and particularly to FIG. 19, FIG. 19 is a functional block diagram of a size counter circuit 607 of the memory controller 6 that includes schematic representations of hardware elements of the memory controller 6 and further indicates several control signals and signal communication pathways. A transfer size latched register 608 receives and stores the output data transfer memory size value DTS of step 17.16 of FIG. 17. The transfer size latched register 608 receives the BACK BUFFER ASSERT signal from the ROM 602 and further receives a RESET signal as a latch value clear signal. A BACK BUFFER signal received by the transfer size latched register 608 from the back buffer 10 writes the initial transfer memory size value of step 17.16 into the transfer size latched register 608.

Alternatively, as enabled by at least the fourth device 24, the transfer size circuit 608 may receive the output data transfer size value DTS from the reconfigurable logic array circuit 26 via the fourth bus BUS.4. Still alternately, in certain other preferred embodiments of the method of the present invention, the transfer size circuit 608 may receive the transfer size value DTS from the target circuit 4 via the fourth bus BUS.4.

The fetch transfer size value FTS is written into a fetch size latched register 610 from the back buffer 10 writes the initial instruction fetch memory size value of step 17.02 into the fetch size latched register 610. It is understood that in certain versions of the method of the present invention, one or more instructions I.1-I.N do not include a fetch transfer size value FTS at least in cases where the instructions I.1-I.N are consistently of a fixed memory size and the transfer value size FTS the fetch size latched register may contain a fixed value that is pre-established and consistently loaded into the size counter 614 as a same instruction fetch memory size value. Alternatively, the back buffer 10 may load a unique or specific fetch transfer size value FTS sourced from the instant Instruction I.1-I.N being executed.

Alternatively, as enabled by at least the fourth device 24, the fetch size latched register 610 may receive the fetch transfer size value FTS from the reconfigurable logic array circuit 26 via the fourth bus BUS.4. Still alternately, in certain other preferred embodiments of the method of the present invention, the fetch size latched register 610 may receive the fetch transfer size value FTS from the target circuit 4 via the fourth bus BUS.4.

An A/B multiplexor 612 (hereinafter, "A/B mux" 612) alternately and sequentially provides (1.) the initial instruction memory fetch size value from the fetch size latch register 610 to a size counter 614 as per step 17.04 of FIG. 17 from the transfer size latched register 608, and (2.) the initial transfer instruction fetch memory size value from the fetch size latch register 610 to the size counter 614 as per step 17.16 of FIG. 17 from the fetch size latched register 610.

The TRANSFER/FETCH signal transmitted from the ROM 604 is provided to the A/B mux 612 to coordinate the alternate writing by the A/B mux 612 into the size counter 614 of (a.) the initial output data transfer memory size value, and (b.) the initial instruction fetch memory size value.

After the size counter 614 receives either the transfer value or fetch value from the NB mux 612, the received value is decremented in accordance with FIG. 17. More particularly the initial transfer memory size value provided form the back buffer 10 to the memory controller 6 is loaded into the size counter 614 in step 17.16, and thereafter decremented in the size counter 614 in repeated executions of step 17.22; and the initial instruction memory size value provided from the back buffer 10 to the memory controller 6 is loaded into the size counter 614 in step 17.02 thereafter transfer memory size value is decremented in the size counter 614 in repeated executions of step 17.08. A SIZE LOAD signal provided by the ROM 604 is input into the size counter 614. In addition, a SIZE DECREMENT signal provided by the ROM 604 directs the size counter 614 to decrement any value held in the size counter 614 at the time of receipt of the SIZE DECREMENT signal.

Referring now generally to the Figures and particularly to FIG. 20, FIG. 20 is a functional block diagram of a memory address circuit 616 of the memory controller 6 that includes schematic representations of hardware elements of the memory controller 6 and further and indicates several control signals and signal communication pathways. The control and data signals of FIG. 20 are in accordance with direction of the currently executing instruction I.1-I.N.

A fetch start latched register 618 receives a fetch start memory address value IFS from the back buffer 10 via the second bus BUS.2. Alternatively, as enabled by at least the fourth device 24, the fetch start latched register 618 may receive the fetch start memory address value IFS from the reconfigurable logic array circuit 26 via the fourth bus BUS.4. Still alternately, in certain other preferred embodiments of the method of the present invention, the fetch start latched register 618 may receive the fetch start memory address value IFS from the target circuit 4 via the fourth bus BUS.4.

A transfer start latched register 620 receives an initial output data memory location address value DRS from the back buffer 10 via the second bus BUS.2. Alternatively, as enabled by at least the fourth device 24, the transfer start latched register 620 may receive the output data memory location address value DRS from the reconfigurable logic array circuit 26 via the fourth bus BUS.4. Still alternately, in certain other preferred embodiments of the method of the present invention, the transfer start latched register 620 may receive the output data memory location address value DRS from the target circuit 4 via the fourth bus BUS.4.

The BACK BUFFER ASSERT signal is received by both the fetch start latched register 618 and the transfer start latched register 620 a clock signal. The RESET signal is received by both the fetch start latched register 618 and the transfer start latched register 620 a latch clear signal. In further accordance with the currently executing instruction I.1-I.N, the fetch start latched register 618 writes the fetch start memory address to the NB mux 614 and thereform into a memory address counter 622 of FIG. 20 and as per step 17.04 of FIG. 17. In alternate clock cycles, the transfer start latched register 620 writes the initial output data memory location address to the A/B mux 614 as per step 17.18 and therefrom into the memory address counter 622, and in accordance with the instruction I.1-I.N currently being executed by the memory controller 6.

The A/B mux 614 alternately and sequentially provides (1.) fetch start memory address to the NB mux 614 as per step 17.04, and (2.) the transfer start latched register 620 writes the initial output data memory location address to the NB mux 614 as per step 17.18. As per the method of FIGS. 17 and 19, operation of the NB mux 614 is directed by the TRANSFER/FETCH signal of the ROM 604.

The memory circuit 616 address further comprises and a plurality of bus drivers 624 that are coupled as output enablers to memory address counter 622, wherein the plurality of bus drivers 624 are communicatively coupled with the first bus BUS.1 or the third bus BUS.3. The memory address counter 622 and the bus drivers 624 write the current value of the memory address counter 622 onto the first bus BUS.1 or the third bus BUS.3 upon receipt by the bus drivers of a memory assert command.

In each execution of each instruction I.1-I.N, the memory address counter 622 receives an initial memory address value in a first execution of step 17.04 within the execution of a particular of an instruction I.1-I.N wherein the initial memory address value is provided from the instant instruction I.1-I.N. The initial memory address value indicates, is or comprises the address of the location in the system memory 6 at which the storage of a selected output data DATA.1-DATA.N begins. This initial memory address value is the incremented in each successive execution of step 17.04 performed in the execution of the instant instruction I.1-I.N that provided the initial memory address value.

In the execution of each instruction I.1-I.N, the memory address counter 622 receives an initial memory address value in a first execution of step 17.18 within the execution of a particular of an instruction I.1-I.N wherein the initial memory address value is provided from the instant instruction I.1-I.N. The initial memory address value indicates, is or comprises the address of the location in the system memory 6 at which the storage of a selected output data DATA.1-DATA.N begins. This initial memory address value is the incremented in each successive execution of step 17.18 performed in the execution of the instant instruction I.1-I.N that provided the initial memory address value.

Figure 21:
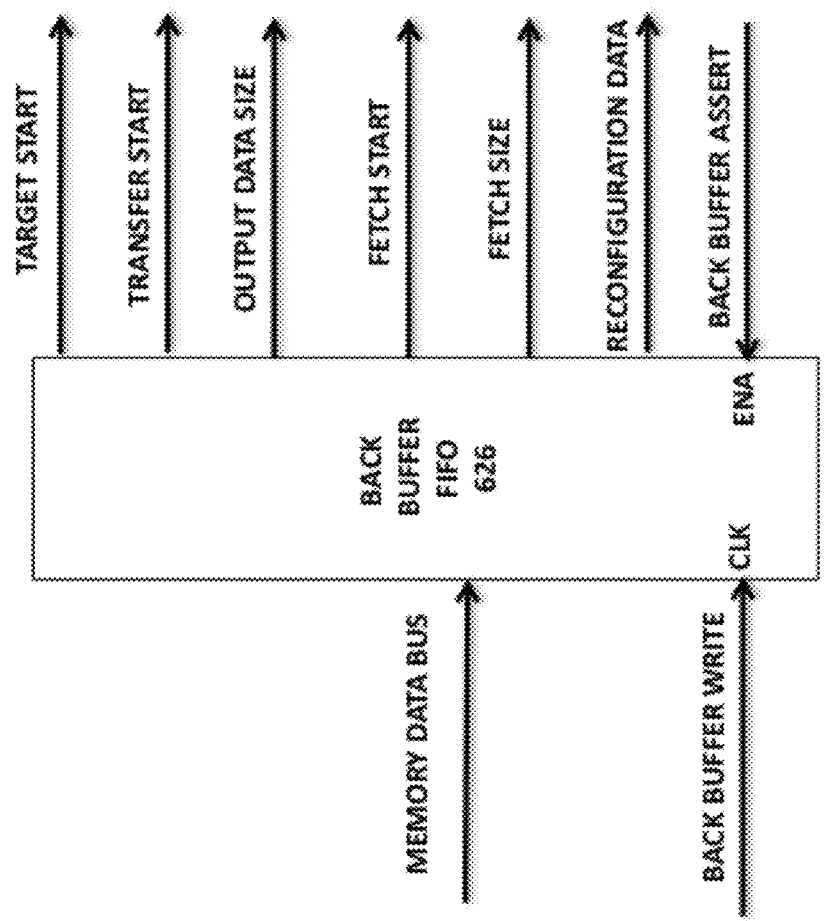
FIG. 21 is a functional block diagram that includes a back buffer first-in first-out circuit (or, "FIFO") of the back buffer of FIG. 1 and further indicates several control signals and signal communication pathways.

Referring now generally to the Figures and particularly to FIG. 21, FIG. 21 is a functional block diagram that includes a back buffer first-in first-out circuit (hereinafter, "FIFO" 626) and indicates several control signals and signal communication pathways. The FIFO 626 is located within the back buffer 10 and transmits a TARGET START signal, a TRANSFER START signal, an OUTPUT DATA SIZE signal, a FETCH START signal, an optional FETCH SIZE signal, and an optional RECONFIGURATION DATA signal. The back buffer is further adapted to provide a MEMORY DATA BUS signal, a BACK BUFFER WRITE signal and a BACK BUFFER ASSERT signal to the FIFO 626. The FIFO 626 receives the BACK BUFFER WRITE signal as a clock signal and the BACK BUFFER ASSERT signal as an enable signal.

The definition of the term "signal" as applied herein includes a digitized or analog electronic message or transmission that may be a mere control signal or may include or provide status information, control signal, and/or data in singularity or in combination.

The TARGET START signal contains the target address write start address value TWS of an instant instruction I.1-I.N or R.1-R.N. The TRANSFER START signal contains the output data read start address value DRS of the same instant instruction I.1-I.N or R.1-R.N. The OUTPUT DATA SIZE signal contains transfer size value DTS of the same instant instruction I.1-I.N or R.1-R.N. The FETCH START signal contains the instruction fetch read start address value IFS of the same instant instruction I.1-I.N or R.1-R.N. The optional FETCH SIZE signal contains the transfer size value FTS of the same instant instruction I.1-I.N or R.1-R.N. Preferably, the TARGET START signal, the TRANSFER START signal, the OUTPUT DATA SIZE signal, the FETCH START signal and the optional FETCH SIZE signal sourced from the same instant instruction I.1-I.N or R.1-R.N are asserted from the FIFO 626 onto the memory controller 6 via the second bus BUS.2 in a same execution of step 17.14. Furthermore, the RECONFIGURATION DATA signal contains reconfiguration data RC.1 from the same instant instruction R.1-R.N and is are asserted from the FIFO 626 onto the target device 4 or reconfigurable logic array 26 via the fifth bus BUS.2 in the same execution of step 17.14.

Figure 22:
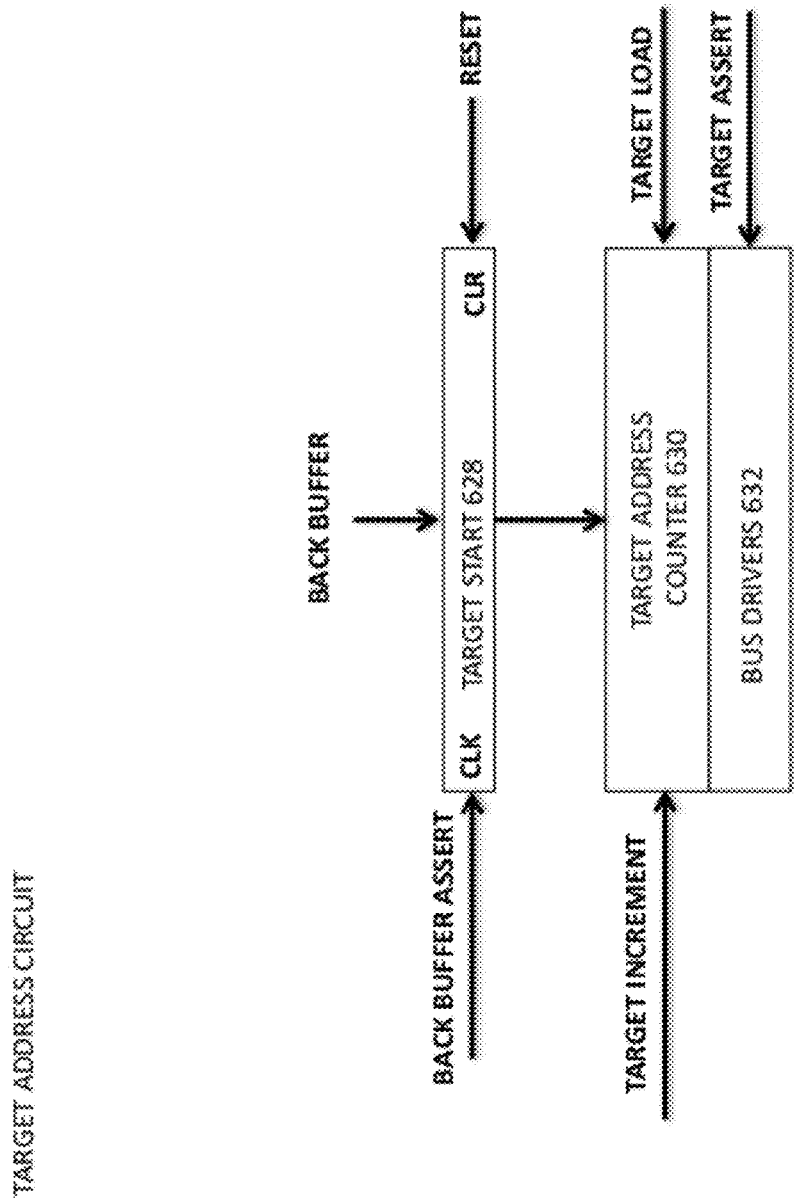
FIG. 22 is a functional block diagram of aspects of the memory controller of FIG. 1 and that includes a target start latched register, a target address counter and a plurality of target data bus drivers and indicates several control signals and signal control communication pathways.

Referring now generally to the Figures and particularly to FIG. 22, FIG. 22 is a functional block diagram that includes a target start latched register 628, a target address counter 630 and a plurality of target data bus drivers 632 and indicates several control signals and signal control communication pathways.

The target start address latched register 628 is located in the memory controller and receives a target address value TWS from the instruction I.1-I.n currently being executed, i.e., the instant instruction I.1-I.N, as asserted by the back buffer 10 via the second bus BUS.2. Alternatively, as enabled by at least the fourth device 24, the target start address latched register 628 may receive the target address value TWS from the reconfigurable logic array circuit 26 via the fourth bus BUS.4. Still alternately, in certain other preferred embodiments of the method of the present invention, target start address latched register 628 may receive the target address value TWS from the target circuit 4 via the fourth bus BUS.4.

The target start address latched register 628 receives the BACK BUFFER ASSERT signal as a clock signal and the RESET signal as a clear signal. The target start address latched register 628 receives the target address value in the first execution of step 17.18 within the execution of each instruction I.1-I.N.

The target address counter 630 and the plurality of target data bus drivers 632 are both located within the memory controller 6 receive the target address value from the target start latched register 628 also in the first execution of step 17.18 within the execution of each instruction I.1-I.N. The target address counter accepts an initial target address value upon receipt of a TARGET LOAD signal.

The target address counter thereupon increments the target address value in each successive execution of step 17.26 of the instruction I.1-I.N from which the target address value was sourced. The target address counter 630 increments the target address value upon each execution of step 17.26 and upon receipt of each TARGET INCREMENT signal. In each execution of step 17.18 the target memory address value is loaded into the plurality of target bus drivers and the plurality of target bus drivers 632 write the target memory address value to the first bus BUS.1 or the third bus BUS.3 to cause an element of an output data DATA.1-DATA.N to be written into the target device 4. The plurality of target bus drivers 632 write the target memory address value to the first bus BUS.1 or the third bus BUS.3 upon each receipt of the TARGET ASSERT signal.

Figure 25:
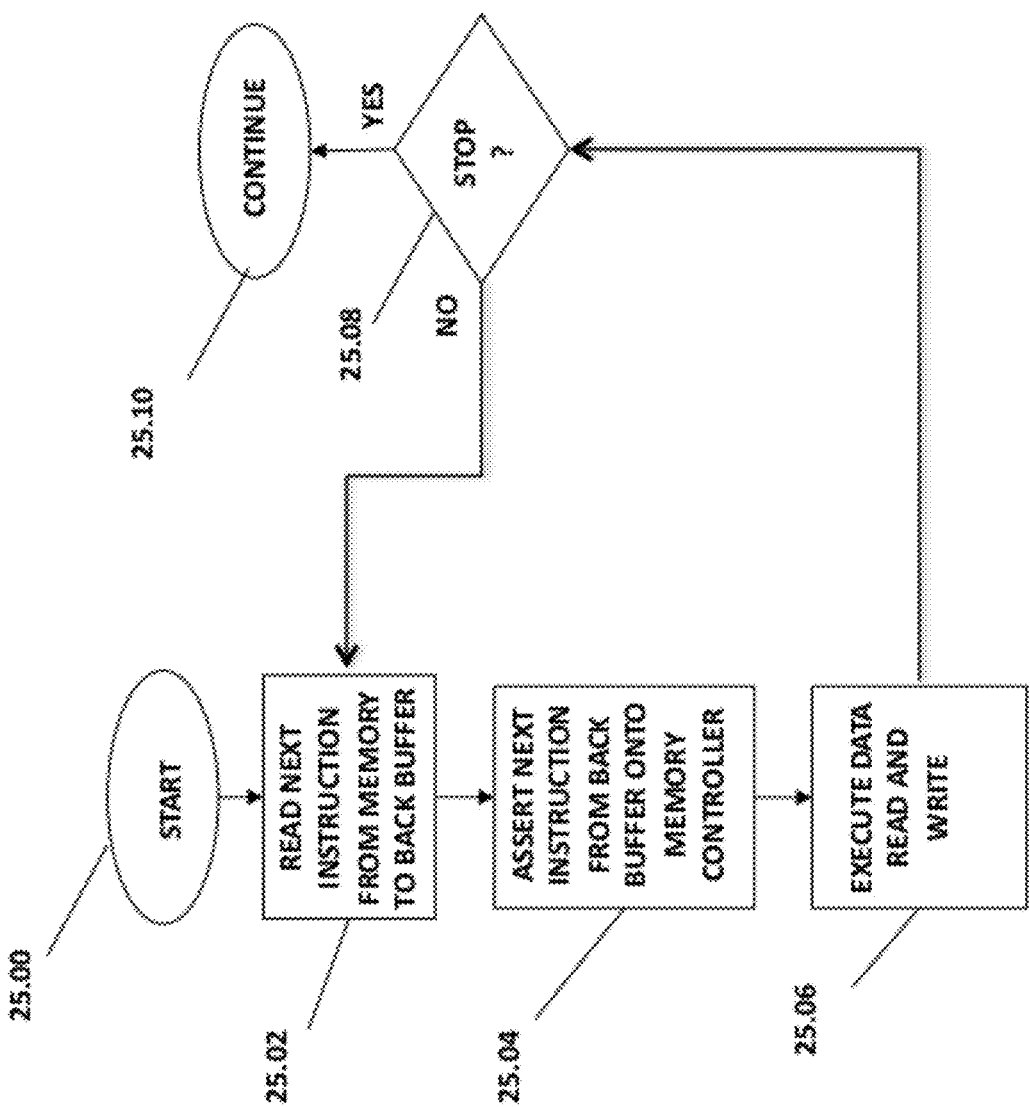
FIG. 25 is a flowchart of an alternate application of certain aspects of the method of the present invention.
Figure 26:
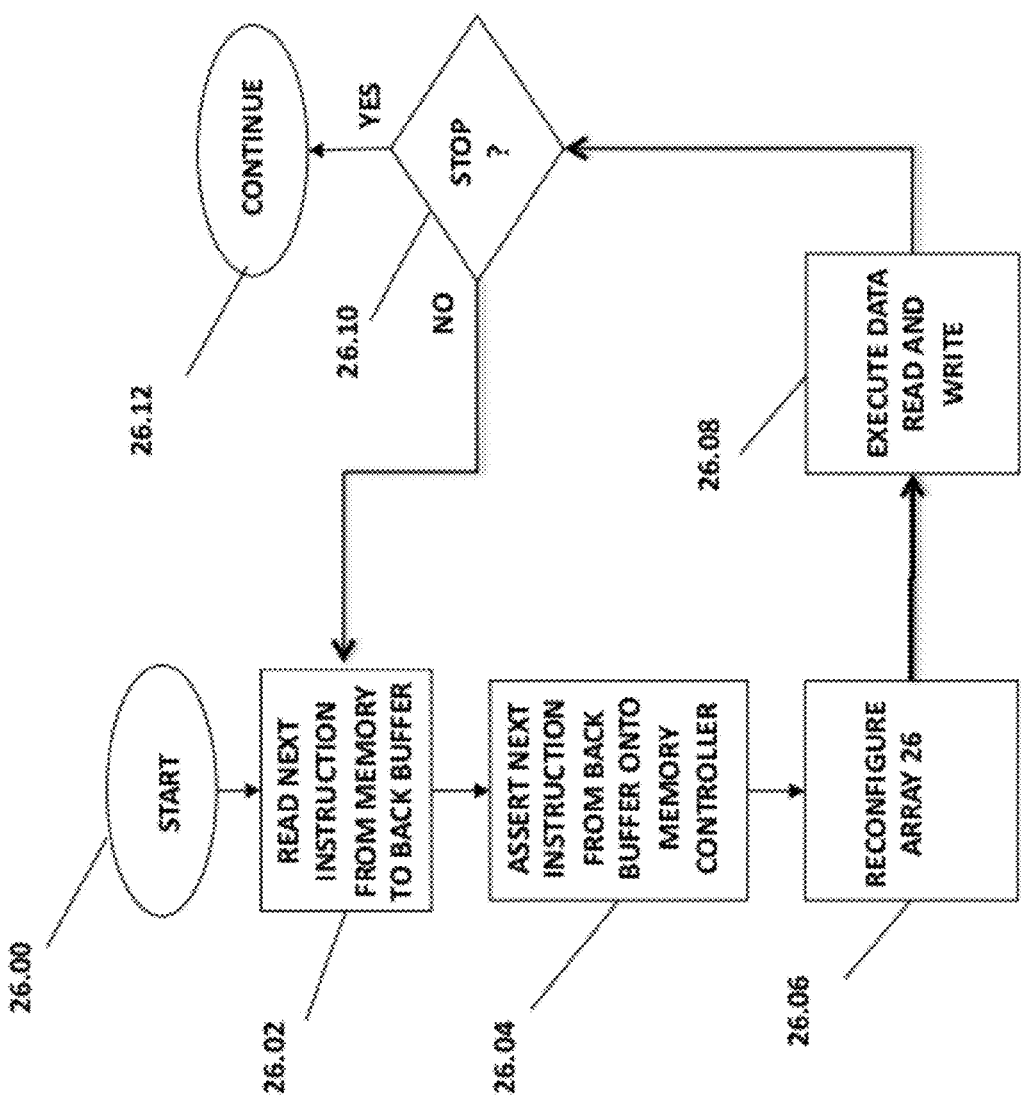
FIG. 26 is a flowchart of an alternate application of certain aspects of the method of the present invention.

Referring now generally to the Figures and particularly to FIGS. 17, 19, 20 and 23, FIG. 23 is a representation of microcode contents of the state machine ROM 604 related to the methods of FIGS. 17, 25 and 26. When the size counter 614 is zero and a next instruction I.1-I.N shall be loaded, the method of the present invention accesses address zero of the ROM 604. Here the size counter 614 is loaded with the instant instruction fetch read start address value IFS and the memory address counter 624 is loaded with the fetch transfer size value FTS and the instruction fetch process of steps 17.02 through 17.12 transfers a next instruction I.1-I.N or R.1-R.N from the system memory 8 to the FIFO 626. Subsequent memory read/write cycles continue instruction transfer until a zero value of the size counter 614 is reached. The next instruction I.1-I.N is asserted at the beginning of the data transfer cycle, i.e., the next instruction I.1-I.N is asserted in step 17.14 after this next instruction I.1-I.N has been loaded in the most recent execution of steps 17.02 through 17.12. Similar to the instruction fetch process of steps 17.02 through 17.12, in the memory transfer process of steps 17.16 through 17.26, the size counter 614 is loaded with the instant transfer size value DTS and the memory address counter 624 is loaded with the output data read start address value DRS. The size counter 614 is decremented in each execution of step 17.22 and values of addresses of the system memory 8 as held in the memory address counter 624 are incremented in each execution of step 17.26. Output data transfers are accomplished in each execution of step 17.20 between system memory 8 and the target device 4 or alternately the reconfigurable array 26. When the value of the size counter 614 again reaches zero, the instruction fetch process is again initiated.

It is understood that the discussion of FIG. 23 may further applicable to the processing of reconfiguration instructions R.1-R.N, I whole or in part.

Figure 24:
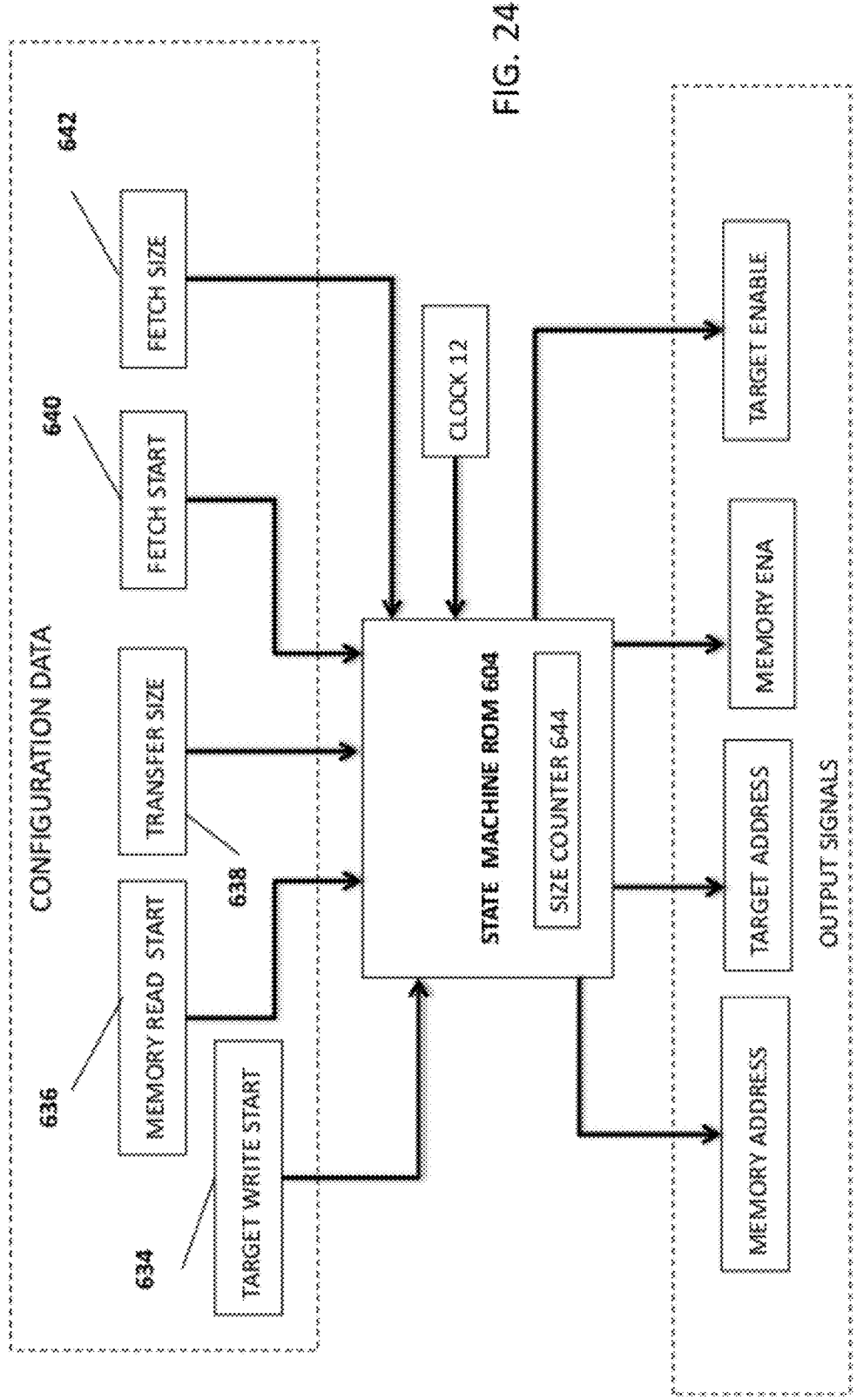
FIG. 24 is a functional block diagram of yet additional aspects of the memory controller of FIG. 1 and that includes the state machine ROM of FIG. 18 and indicates several control signals and signal control communication pathways.

Referring now generally to the Figures and particularly to FIG. 24, FIG. 24 is a functional block diagram of yet additional aspects of the memory controller 6 and that includes the state machine ROM 604 of the memory controller 6 and indicates several control signals and signal control communication pathways.

It is understood that each instruction I.1-I.N may include (a.) a target address write start address value TWS; (b.) a system memory output data read start address value DRS of an instant output data DATA.1-DATA.N; (c.) a transfer size value DTS of the output data DATA.1-DATA.N of that read start address value DRS; (d.) an instruction fetch read start address value IFS of a following instruction to be fetched and loaded into the back buffer 10; and (e.) the optional fetch transfer size value FTS of the following instruction I.1-I.N associated with that fetch read start address value IFS. It is understood that in certain versions of the method of the present invention, one or more instructions I.1-I.N do not include a fetch transfer size value FTS at least in cases where the instructions I.1-I.N are consistently of a fixed memory size and the transfer value size FTS may thereby be pre-established in the memory controller 6.

The memory controller 6 of the first device 2 is adapted to receive the five data values of (a.) the target address write start address value TWS (or "target write start" TWS); (b.) the system memory output data read start address value DRS (or "memory read start" DRS); (c.) the transfer size value DTS (or "transfer size" DTS); (d.) the instruction fetch read start address value IFS (or "fetch start" IFS); and (e.) the fetch transfer size value FTS (or "fetch size" FTS) from the back buffer 10.

The memory controller 6 applies the fetch start IFS and the fetch size FTS to direct the first data bus BUS.1 or the third data bus BUS.3 to write a following instruction I.1-I.N into the back buffer 10. It is understood that in certain versions of the method of the present invention, one or more instructions I.1-I.N do not include a fetch transfer size value FTS at least in cases where the instructions I.1-I.N are consistently of a fixed memory size and the transfer value size FTS may thereby be pre-established in the memory controller 6.

The target write start TWS is written into a TWS latched register 634. The memory read start DRS is written into a DRS latched register 636. The transfer size value DTS is written into a DTS latched register 638. The fetch read start IFS is written into an IFS latched register 640. The fetch transfer size value FTS is written into an FTS latched register 642. It is understood that in certain versions of the method of the present invention, one or more instructions I.1-I.N do not include a fetch transfer size value FTS at least in cases where the instructions I.1-I.N are consistently of a fixed memory size and the transfer value size FTS may thereby be pre-established in FTS latched register 642.

Alternately optionally or additionally, the memory controller 6, the back buffer 10, the fourth bus BUS.4 and/or the third bus BUS.3 of the first device 2, the second device 22, the third device 23 and/or the fourth device 24 may be configured to source the target write start TWS, the memory read start DRS, the transfer size value DTS, the instruction fetch read start address value IFS, and the fetch transfer size value FTS from the target device 4 or the reconfigurable logic array 26.

The memory controller latched registers 634-640 of the memory controller 6 write the values contained therein into the state machine ROM 604. A clock signal from the clock 12 supports the operation of the memory controller latched registers 634-640 in the course of executing each instruction I.1-I.N. A size counter 644 of the static machine ROM 604 is also applied to support the operation of the memory controller 6 in the course of the execution each instruction I.1-I.N.

The state machine ROM 604 is adapted to generate the output signals of MEMORY ADDRESS, TARGET ADDRESS, MEMORY ENABLE AND TARGET ENABLE in the course of the execution each instruction I.1-I.N. The MEMORY ADDRESS signal contains an address value of the system memory 8 as applied in steps 17.18 and 17.20. The TARGET ADDRESS signal contains an address value of the target device 4 and/or the reconfigurable logic array 26 that is also as applied in steps 17.18 and 17.20. The MEMORY ENABLE signal is further applied in steps 17.18 and 17.20 from the memory controller 6 to the system memory 8 and directs the system memory 8 to write data to the first bus BUS.1 or the third bus BUS.3. The TARGET ENABLE signal is additionally applied in steps 17.18 and 17.20 from the memory controller 6 to the target device 4 and/or the reconfigurable logic array 26 and directs the target device 4 and/or the reconfigurable logic array 26 to write data to the first bus BUS.1 or the third bus BUS.3.

Referring now generally to the Figures and particularly to FIG. 25, FIG. 25 is a flowchart of an alternate application of certain aspects of the method of the present invention. For the sake of illustration of the method of FIG. 25, it may be supposed that four instructions I.1-I.4 are to be sequentially executed by the memory controller 6. In a first execution of step 25.02, the fetch configuration data F.1 of the first instruction I.1 is executed by the memory controller 6, whereupon a second instruction I.2 is written into the back buffer 10. In the following execution of step 25.04, the second instruction I.2 is asserted from the back buffer 10 and to the memory controller 6. In step 25.04 the FIFO 626 of the back buffer 10 and transmits the TARGET START signal, the TRANSFER START signal, the OUTPUT DATA SIZE signal, the FETCH START signal, and optionally the FETCH SIZE signal to the memory controller 6.

In the following step 25.06, the transfer configuration data T.1 of the second instruction I.2 is executed by the memory controller, whereby one selected output data DATA.1-DATA.N is written to the target device 4 or the reconfigurable logic array 26. The memory controller 6 then determines whether to continue reading and executing instructions I.1-I.N in step 25.08. In this exemplary discussion, the memory controller 6 proceeds from step 25.08 to an additional execution of step 25.02, by which the memory controller 6 applies the fetch configuration data F.1 of the second instruction I.2 to load a third instruction I.3 from system memory 8 and into the back buffer 10. The third instruction I.3 is the asserted from the back buffer 10 to the memory controller in the following execution of step 25.04, and a selected output data DATA.1-DATA.N is written to the target device 4 or the reconfigurable logic array 26 in accordance with the transfer configuration data T.1 of the third instruction I.3 in step 25.06. In the next execution of step 25.02 a fourth instruction I.4 is written into the back buffer 10 and in accordance with the fetch configuration data F.1 of the third instruction I.3. The fourth instruction I.4 is then asserted upon the memory controller 6 in the next execution of step 25.04.

Referring now generally to the Figures and particularly to FIG. 26, FIG. 26 is a flowchart of an alternate application of certain aspects of the method of the present invention. For the sake of illustration of the method of FIG. 26, it may be supposed that four reconfiguration instructions R.1-R.4 are to be sequentially executed by the memory controller 6. In a first execution of step 26.02, the fetch configuration data F.1 of the first reconfiguration instruction R.1 is executed by the memory controller 6, whereupon a second reconfiguration instruction R.2 is written into the back buffer 10. In the following execution of step 26.04 the fetch configuration data F.1 and the transfer configuration T.1 of the second reconfiguration instruction R.2 is asserted from the back buffer 10 and to the memory controller 6. In step 26.04 the FIFO 626 of the back buffer 10 transmits information from a same instant instruction, e.g., the second reconfiguration instruction R.2, wherein the FIFO 626 asserts (a.) the TARGET START signal, the TRANSFER START signal, the OUTPUT DATA SIZE signal, the FETCH START signal, and optionally the FETCH SIZE signal to the memory controller 6 via the second bus.2, and (b.) preferably simultaneously or near simultaneously transmits the RECONFIGURATION DATA signal to the target device 4 or reconfigurable logic circuit array 26.

In the following execution of step 26.06 the reconfiguration data RC.1 of the second reconfiguration instruction R.2 is asserted upon the reconfigurable circuit array 26, and the reconfigurable circuit array 26 is thereupon reconfigured in accordance with the reconfiguration data RC.1 of the second reconfiguration instruction R.2. It is understood that steps 26.04 and 26.06 may occur simultaneously or initiate within microseconds of each other.

In the following step 26.08 the transfer configuration data T.1 of the second reconfiguration instruction R.2 is executed by the memory controller 6, whereby one selected output data DATA.1-DATA.N is written to the reconfigurable logic circuit array 26. The memory controller 6 then determines whether to continue reading and executing instructions I.1-I.N in step 26.10. In this exemplary discussion, the memory controller 6 proceeds from step 26.10 to an additional execution of step 26.02, by which the memory controller 6 applies the fetch configuration data F.1 of the second reconfiguration instruction R.2 to load a third reconfiguration instruction R.3 into the back buffer 10.

The fetch configuration data F.1 and the transfer configuration data T.1 of the third reconfiguration instruction R.3 are then asserted from the back buffer 10 to the memory controller 6 in the following execution of step 26.04, and the reconfiguration data RC.1 of the third reconfiguration instruction R.3 is asserted from the back buffer 10 upon the reconfigurable logic circuit array 26 in step 26.06. A particular output data DATA.1-DATA.N is written to the reconfigurable logic circuit array 26 in accordance with the transfer configuration data T.1 of the third reconfiguration instruction R.3 in the following execution of step 26.08.

In the next execution of step 26.02 a fourth reconfiguration instruction R.4 is written into the back buffer 10 and in accordance with the fetch configuration data F.1 of the third instruction R.3. The fetch configuration data F.1 and the transfer configuration data T.1 fourth reconfiguration instruction R.4 is then asserted upon the memory controller 6 in the next execution of step 26.04; the reconfiguration data RC.1 of the fourth reconfiguration instruction R.4 is asserted in the related execution of step 26.06; output data DATA.1-DATA.N is written from the system memory 8 and into the reconfigurable logic circuit array 26 in step 26.08; and the fetch configuration data F.1 of the fourth reconfiguration instruction I.4 is executed by the memory controller in the following execution of step 26.02.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

I claim:

1. A device comprising:
  a body of reconfigurable logic communicatively coupled with a memory, a memory controller, a state machine, and a back buffer, and;

the memory storing a plurality of instructions, each instruction including a fetch configuration data portion and a reconfiguration data portion, wherein the reconfiguration data portion reconfigures the body of reconfigurable logic and configures the memory controller of the device;

the memory controller communicatively coupled with the memory;

the state machine communicatively coupled to the memory controller, the state machine adapted to direct the memory controller to fetch succeeding instructions and data from the memory based upon a previous or default configuration; and the back buffer coupled with the memory controller, the state machine and the body of reconfigurable logic, wherein the back buffer is adapted to receive instructions from the memory controller and as directed by the state machine sequentially assert each received instruction upon the memory controller, the state machine and the body of reconfigurable logic.

2. The device of claim 1, wherein the back buffer is implemented on-chip with the memory controller.

3. The device of claim 1, wherein the back buffer is comprised within the memory controller.

4. The device of claim 1, wherein the memory controller is bi-directionally coupled with the body of reconfigurable logic and the memory, and the memory controller is adapted to receive data from the body of reconfigurable logic and to deliver the target data to the memory as directed by the state machine and in accordance with the reconfiguration data portion of the most recently asserted instruction.

5. The device of claim 1, wherein the memory controller is bi-directionally coupled with the body of reconfigurable logic and the memory controller is adapted to receive assertions of configuration data by the body of reconfigurable logic.

6. The device of claim 5, wherein the memory controller is bi-directionally coupled with the memory, and the memory controller is adapted to receive data from the body of reconfigurable logic and to deliver the data to the memory.

7. The device of claim 1, wherein the state machine is adapted to direct the back buffer to communicate at least one datum of reconfiguration data to the body of reconfigurable logic in accordance with the reconfiguration data portion of the most recently asserted instruction.

8. The device of claim 7, wherein the memory controller is adapted to receive output data from the body of reconfigurable logic and to deliver the output data to the memory.

9. The device of claim 7, wherein the memory controller is bi-directionally coupled with the body of reconfigurable logic and the memory controller is adapted to receive assertions of reconfiguration data by the body of reconfigurable logic.

* * * * *